(12) United States Patent
Ishihara et al.

(10) Patent No.: US 7,822,507 B2
(45) Date of Patent: Oct. 26, 2010

(54) INPUT DEVICE AND INPUTTING METHOD

(75) Inventors: Atsushi Ishihara, Tokyo (JP); Nobuhiko Ohguchi, Tokyo (JP); Tomohiro Yamada, Kanagawa (JP)

(73) Assignee: Sony Corporation (JP)

( * ) Notice: Subject to any disclaimer, the term of this patent is extended or adjusted under 35 U.S.C. 154(b) by 368 days.

(21) Appl. No.: 11/496,916

(22) Filed: Aug. 1, 2006

(65) Prior Publication Data

US 2007/0050087 A1 Mar. 1, 2007

(30) Foreign Application Priority Data

Aug. 31, 2005 (JP) ............................ P2005-252690

(51) Int. Cl.
*G06F 19/00* (2006.01)

(52) U.S. Cl. ..................... 700/245; 345/156

(58) Field of Classification Search ............... 700/245, 700/17; 318/568.2, 567; 901/1, 8; 324/47, 324/457; 345/156, 161, 157; 224/219, 224, 224/222, 218, 267

See application file for complete search history.

(56) References Cited

U.S. PATENT DOCUMENTS

| 5,528,265 | A | * | 6/1996 | Harrison | 345/158 |
|---|---|---|---|---|---|
| 5,703,623 | A | * | 12/1997 | Hall et al. | 345/158 |
| 5,750,934 | A | * | 5/1998 | Kuljis | 174/135 |
| 6,232,735 | B1 | * | 5/2001 | Baba et al. | 318/567 |
| 6,505,098 | B1 | * | 1/2003 | Sakamoto et al. | 700/245 |
| 6,681,419 | B1 | * | 1/2004 | Page | 4/661 |
| 6,711,469 | B2 | * | 3/2004 | Sakamoto et al. | 700/245 |
| 6,726,070 | B2 | * | 4/2004 | Lautner | 224/221 |
| 7,161,579 | B2 | * | 1/2007 | Daniel | 345/156 |
| 7,236,852 | B2 | * | 6/2007 | Moridaira et al. | 700/245 |
| 7,310,086 | B2 | * | 12/2007 | Tai et al. | 345/158 |
| 2004/0167671 | A1 | * | 8/2004 | Aoyama | 700/259 |
| 2004/0245959 | A1 | * | 12/2004 | Komiya | 318/607 |
| 2005/0197739 | A1 | * | 9/2005 | Noda et al. | 700/245 |
| 2005/0219114 | A1 | * | 10/2005 | Kawabe et al. | 342/47 |
| 2005/0228540 | A1 | * | 10/2005 | Moridaira | 700/245 |
| 2005/0237021 | A1 | * | 10/2005 | Sugano et al. | 318/610 |
| 2005/0267631 | A1 | * | 12/2005 | Lee et al. | 700/245 |
| 2006/0155391 | A1 | * | 7/2006 | Pistemaa et al. | 700/17 |

FOREIGN PATENT DOCUMENTS

| EP | 101166 A1 * | 6/2000 |
|---|---|---|
| JP | 09179686 A | 7/1997 |
| JP | 2001242845 A | 9/2001 |
| JP | 2003005898 A | 1/2003 |
| JP | 2004-046645 A | 2/2004 |

OTHER PUBLICATIONS

Oliver et al. ; Desinging 3D Input Device fo Immersive Environments; 2004, IEEE, pp. 6280-6285.*

Office Action from Japanese Application No. 2005-252690, dated Jul. 29, 2010.

* cited by examiner

*Primary Examiner*—Kidest Bahta
(74) *Attorney, Agent, or Firm*—Lerner, David, Littenberg, Krumholz & Mentlik, LLP

(57) ABSTRACT

An input device is disclosed which includes: a casing; an input unit provided in the casing; an orientation detection unit configured to detect the orientation of the casing; and a command assigning unit configured to assign commands to inputs from the input unit, based on the results of detection by the orientation detection unit.

13 Claims, 10 Drawing Sheets

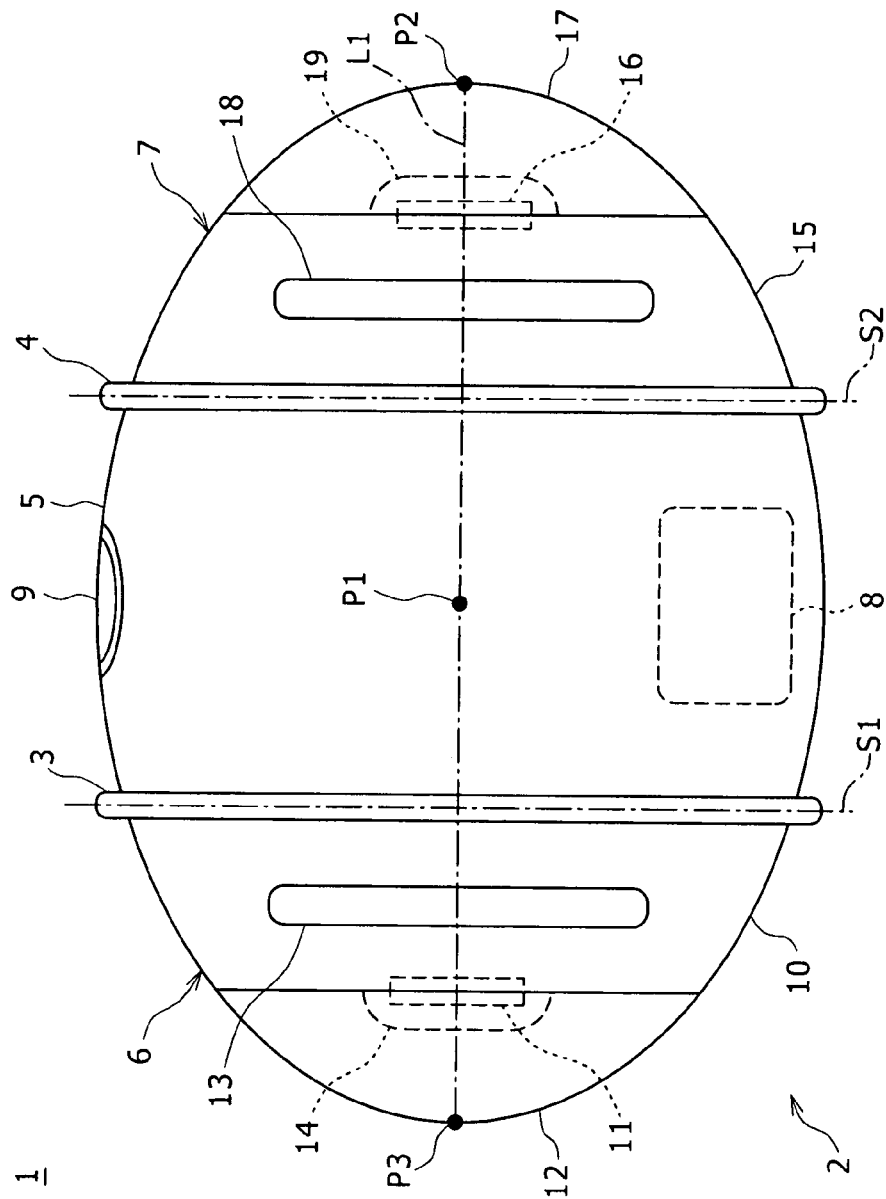

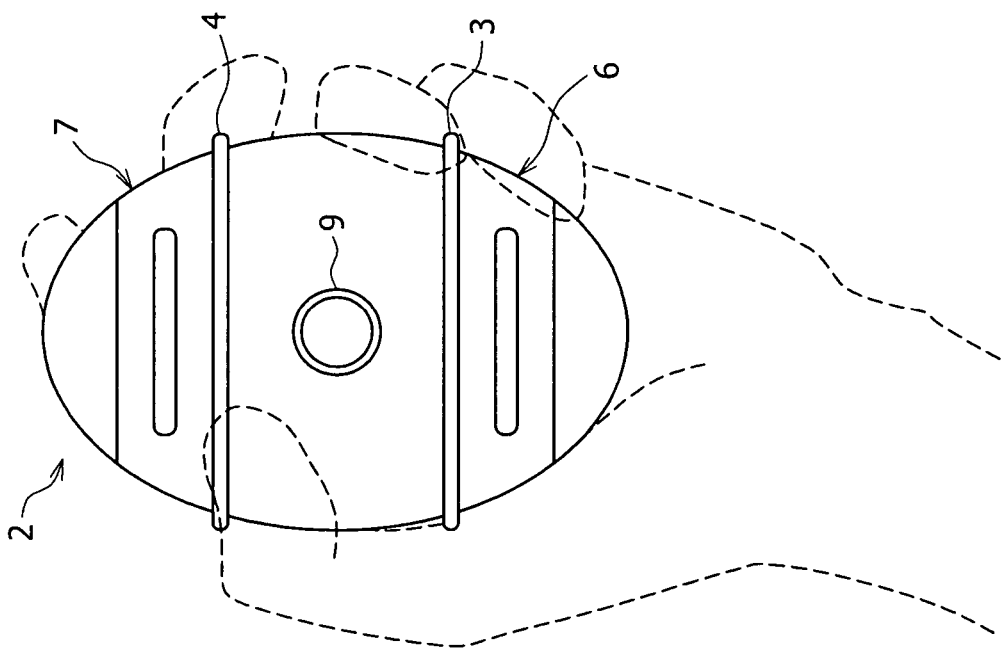
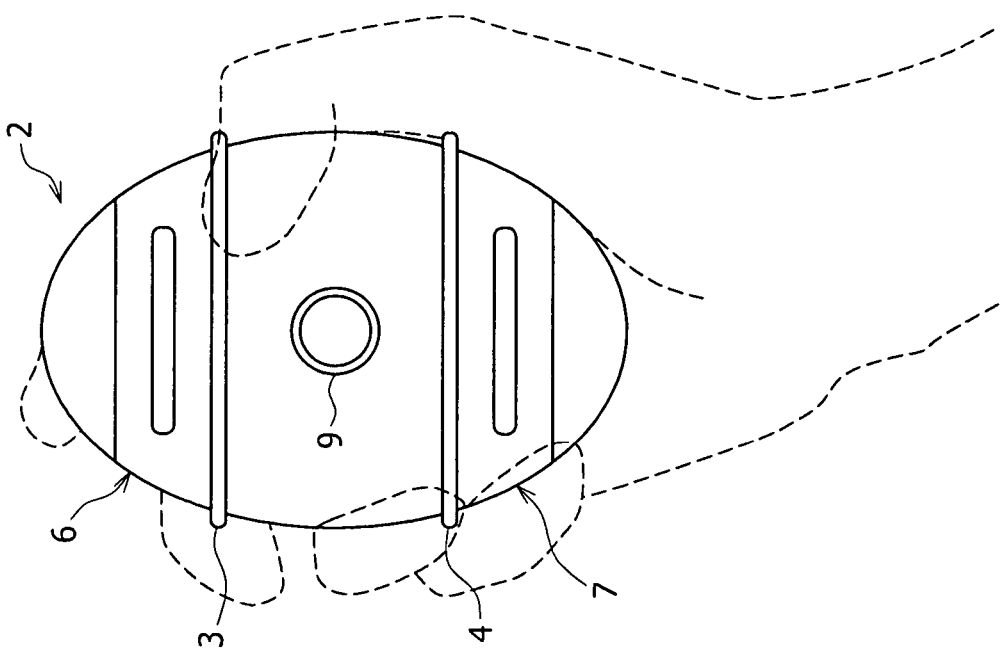

INPUT DEVICE AND INPUTTING METHOD

CROSS REFERENCES TO RELATED APPLICATIONS

The present invention contains subject matter related to Japanese Patent Application No. JP 2005-252690 filed in the Japanese Patent Office on Aug. 31, 2005, the entire contents of which being incorporated herein by reference.

BACKGROUND OF THE INVENTION

1. Field of the Invention

The present invention relates to an input device and an inputting method, and is suitable for application to, for example, an input device used in the state of facing in an arbitrary orientation.

2. Description of the Related Art

In recent years, a variety of input devices have been proposed; for example, an input device having an input unit (e.g., a jog dial) operable to accept turning operations and a pressing operation as inputs has been proposed (refer to, for example, Japanese Patent Laid-Open No. 2004-46645 (FIG. 14)).

Besides, as an input device having such an input unit, in practice, there have been known cellular phones, PDAs (Personal Digital Assistants), mouse, robot apparatuses, toys, etc.

SUMMARY OF THE INVENTION

Meanwhile, the input devices according to the related art have been designed on the assumption that they are used in the state of being directed in a predetermined orientation, and predetermined commands have been set with respect to inputs from the input unit in such a manner that the input devices are easy to use when directed in the predetermined orientation. Therefore, such an input device has the problem that when it is used in the state of being directed in other orientation than the predetermined orientation, the operating method becomes different from that when the input device is used in the state of being directed in the predetermined orientation, and the input device therefore becomes difficult to use.

Thus, there is a need for an input device which can be much enhanced in operability, regardless of the orientation in which the input device is used.

In order to fulfill the above need, according to an embodiment of the present invention, there is provided an input device including: a casing; an input unit provided in the casing; an orientation detection unit configured to detect the orientation of the casing; and a command assigning unit configured to assign commands to inputs from the input unit, based on the results of detection by the orientation detection unit.

With the commands thus assigned to the inputs from the input unit in accordance with the orientation of the casing, the commands assigned to the inputs from the input unit are changed according to the orientation of the casing, whereby it is made possible to always conduct inputting operations by the same operating method.

According to an embodiment of the present invention, the commands are assigned to the inputs from the input unit in accordance with the orientation of the casing, whereby the commands assigned to the inputs from the input unit are changed according to the orientation of the casing, making it possible to always conduct the inputting operations by the same operating method. As a result, it is possible to realize an input device and an inputting method which can be much enhanced in operability, regardless of the orientation in which the input device is used.

BRIEF DESCRIPTION OF THE DRAWINGS

FIG. 2 is a schematic diagram showing a front configuration of the music reproducing robot apparatus;

FIGS. 8A and 8B are schematic diagrams showing the condition where the ellipsoidal casing is lifted up;

DETAILED DESCRIPTION OF THE PREFERRED EMBODIMENTS

Figure 1A:
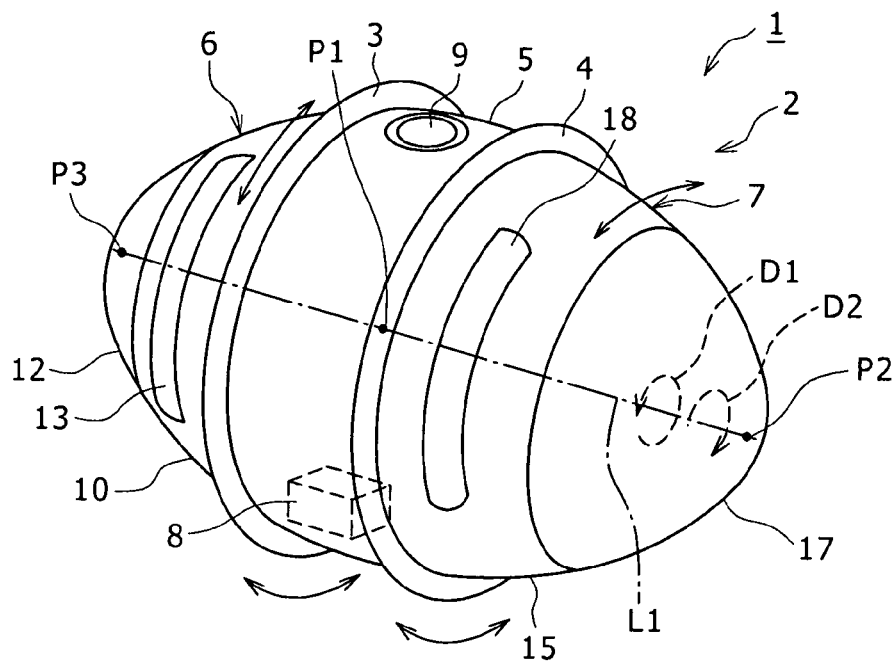
FIGS. 1A and 1B are schematic diagrams showing an apparent configuration of a music reproducing robot apparatus.

Now, an embodiment of the present invention will be described in detail below, referring to the drawings.

(1) Apparent Configuration of Music Reproducing Robot Apparatus

Figure 1B:
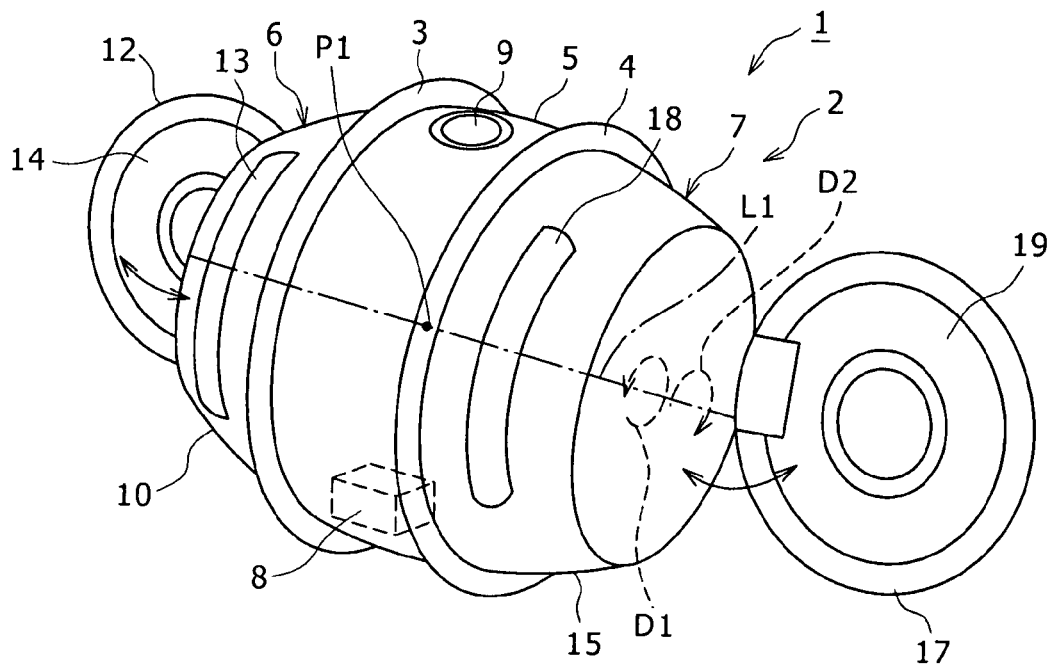

In FIGS. 1A and 1B and FIG. 2, symbol 1 denotes generally a music reproducing robot apparatus. The music reproducing robot apparatus 1 has, for example, an ellipsoidal casing 2 which is substantially ellipsoidal in shape.

In addition, the music reproducing robot apparatus 1 has a configuration in which annular and same-shaped left-side wheel 3 and right-side wheel 4 are mounted, in the manner of projecting from an outer circumference of the ellipsoidal casing 2, on a left-side vertical plane S1 and a right-side vertical plane S2 which orthogonally intersect, at positions equidistant from the center P1 of the ellipsoidal casing 2, with a horizontal rotational axis L1 which is a straight line segment connecting between both apexes P2 and P3 located on the surface of the ellipsoidal casing 2 and the farthest from the center P1 of the ellipsoidal casing 2 (i.e., the straight line segment is the major axis of the ellipsoid).

The annular left-side wheel 3 and right-side wheel 4 have an outside diameter greater than the maximum outside diameter, around the horizontal rotational axis L1, of the ellipsoidal casing 2, and are so attached as to be turnable relative to the ellipsoidal casing 2 in one direction D1 and the other (opposite) direction D2 around the horizontal rotational axis L1. This ensures that when the music reproducing robot apparatus 1 is placed, for example, on a horizontal floor, only the left-side wheel 3 and the right side wheel 4 make contact with the floor surface, whereby the ellipsoidal casing 2 can be supported by the left-side wheel 3 and the right-side wheel 4 in a horizontal state of being floated up from the floor surface, and the music reproducing robot apparatus 1 in this condition can perform self-propelled running on the floor by rotating the left-side wheel 3 and the right-side wheel 4. In addition, as will be described in detail later, the left-side wheel 3 and the right-side wheel 4 can be freely turned by a user's finger or the like when the ellipsoidal casing 2 is lifted up by the user, and each function as an input unit configured to accept a command input according to the turning operation.

Furthermore, the ellipsoidal casing 2 has a central casing 4 located between the left-side wheel 3 and the right-side wheel 4, a substantially conical left-side casing 6 located on the left side of the central casing 5 and formed in the manner of being tapered off to the horizontal rotational axis L1 side as one goes away from the central casing 5 side to approach the left end, and a substantially conical right-side casing 7 located on the right side of the central casing 5 and formed in the manner of being tapered off to the horizontal rotational axis L1 side as one goes away from the central casing 5 side to approach the right end.

The central casing 5 is provided therein with a dead weight 8 composed of a battery or the like on the central lower side, and due to the presence of the dead weight 8, the center of gravity of the central casing 5 is located on the vertically lower side of the center P1. This ensures that notwithstanding the two-point contact at the left-side wheel 3 and the right-side wheel 4, even when the music reproducing robot apparatus 1 performs self-propelled running, for example, the central casing 5 can be prevented from continuing to rotate in the one direction D1 or the other direction D2 about the horizontal rotational axis L1, and the posture of the central casing 5 can be maintained. Incidentally, the posture of the music reproducing robot apparatus 1 such that the left-side wheel 3 and the right-side wheel 4 are set in contact with a horizontal surface such as a floor to hold the ellipsoidal casing 2 horizontal and the dead weight 8 in the central casing 5 is located on the vertically lower side of the center P1 will be referred to also as the standard posture of the music reproducing robot apparatus 1.

In addition, the central casing 5 is provided also with a contact detection sensor unit 9 operable to detect a touch on the surface thereof by a finger, a hand or the like. Here, the contact detection sensor unit 9 has, for example, an electrostatic sensor operable to detect a change in electrostatic capacity due to a human body touching a fingertip-sized detection area provided in the surface of the central casing 5.

On the other hand, the left-side casing 6 has a left-side rotating body 10 mounted to be turnable in the one direction D1 and the other direction D2 (FIG. 1) about the horizontal rotational axis L1 relative to the central casing 5, and a left-side opening/closing body 12 attached to the left side of the left-side rotating body 10 through a hinge portion 11 so as to be openable to the left outer side and closable. The left-side rotating body 10 is provided at its surface with a left-side light emission unit 13 including a light emitting diode or the like. In addition, the left-side opening/closing body 12 has a loudspeaker 14 therein, and, when it is opened to the left outer side through the hinge portion 11, the loudspeaker 14 is exposed to the exterior as shown in FIG. 1B.

Similarly, the right-side casing 7 has a right-side rotating body 15 mounted to be turnable in the one-direction D1 and the other direction D2 about the horizontal rotational axis L1 relative to the central casing 5, and a right-side opening/closing body 17 attached to the right side of the right-side rotating body 15 through a hinge portion 16 so as to be openable to the right outer side and closable. The right-side rotating body 15 is provided at its surface with a right-side light emission unit 18 including a light emitting diode or the like. Besides, the right-side opening/closing body has a loudspeaker 19 therein, and, when it is opened to the right outer side, the loudspeaker 19 is exposed to the exterior as shown in FIG. 1B.

(2) Musical Data Transfer System

Figure 3:
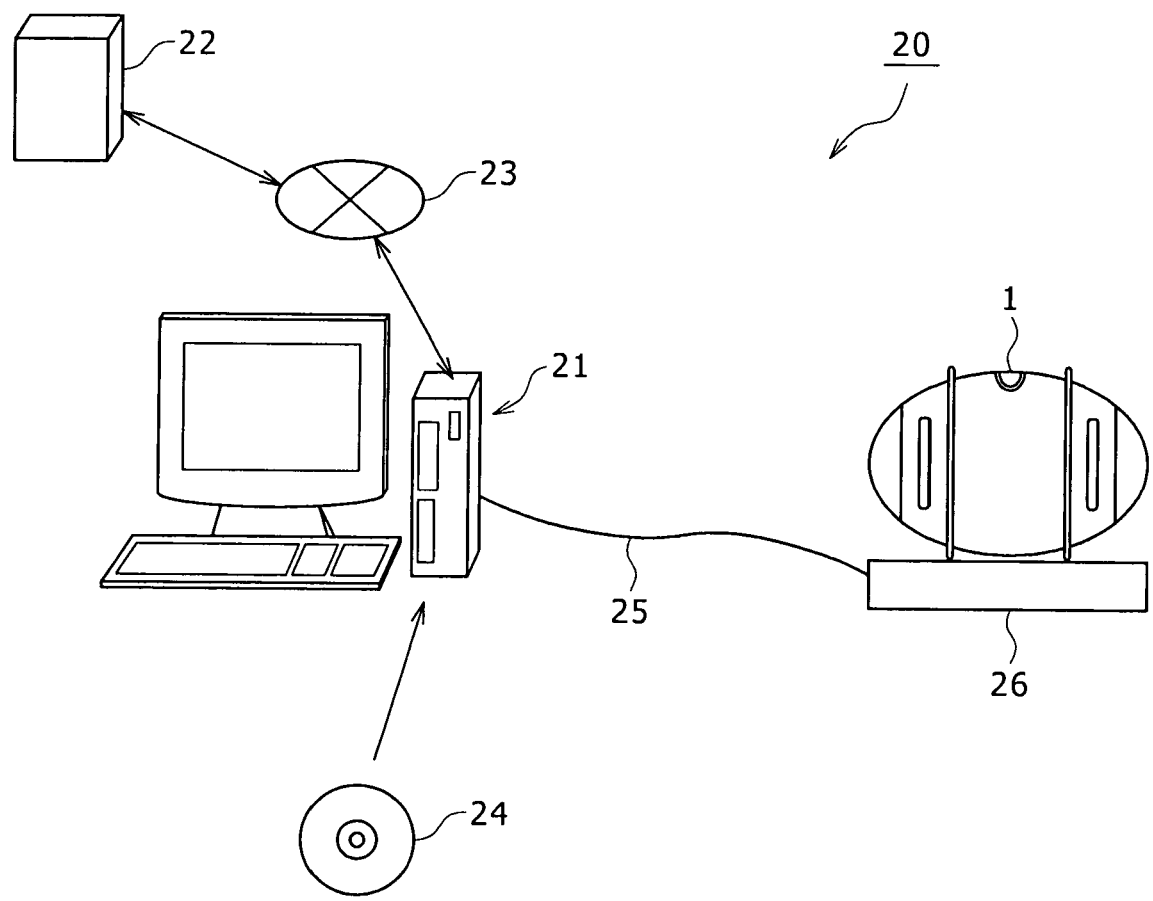
FIG. 3 is a schematic diagram showing a configuration of a musical data transfer system.

Now, referring to FIG. 3, a musical data transfer system 20 operable to transfer musical data to the music reproducing robot apparatus 1 will be described. The musical data transfer system 20 has a data transfer device 21 configured by use of a personal computer, for example. The data transfer device 21 is configured to acquire musical data through a network 23 from a musical data supply server 22 supplying musical data, or to acquire musical data from a recording medium such as CD (Compact Disc) on which musical data is recorded.

Figure 4:
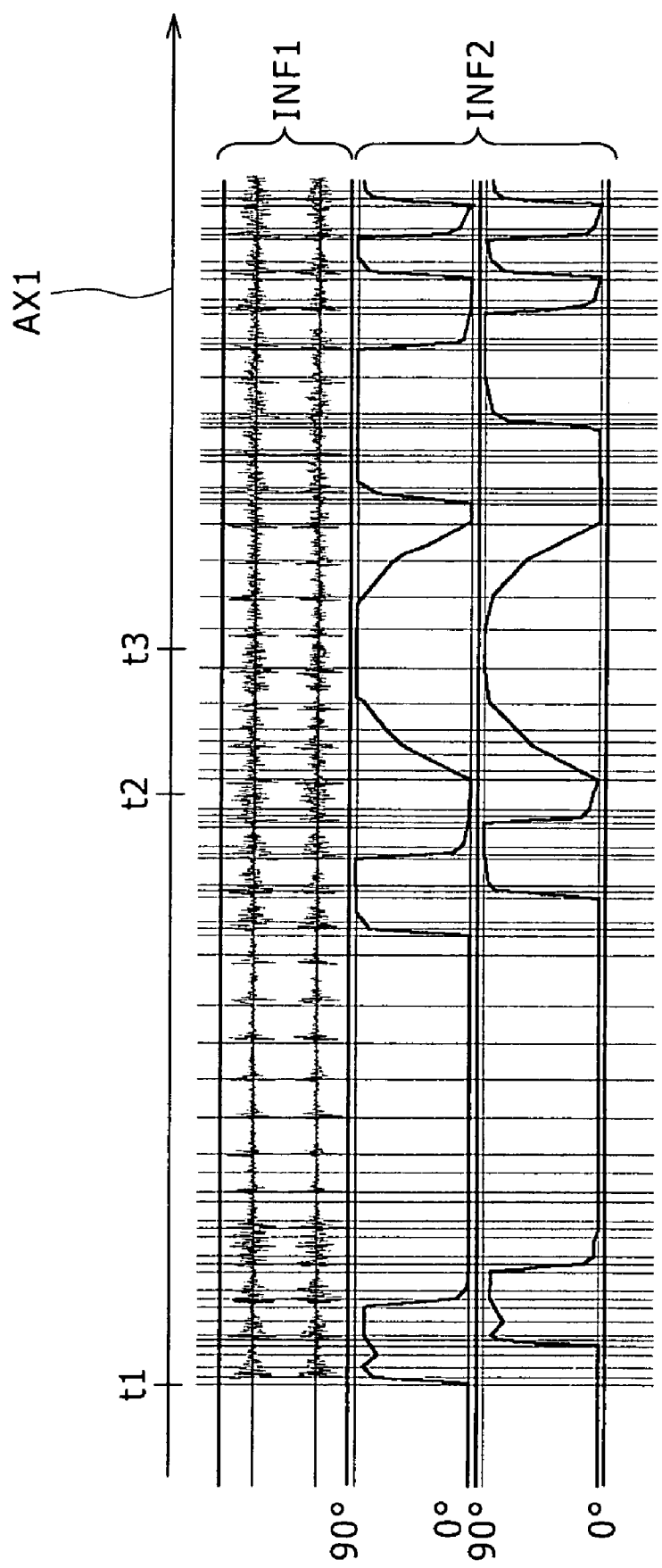
FIG. 4 is a graph showing music analysis result information and drive information.

The data transfer device 21 applies, for example, a frequency analysis for analyzing the strains of music based on the musical data, to the musical data to be transferred to the music reproducing robot apparatus 1. By this, the data transfer device 21 obtains a music analysis result information INF1 showing the results of the frequency analysis of the musical data to be transferred, along a reproduction time axis AX1 of the musical data, as shown in FIG. 4, for example.

Then, based on the music analysis result information INF 1, the data transfer device 21 produces drive information INF2 including: left-side wheel instruction values and right-side wheel instruction values for instructing the respective rotating directions, rotation amounts, rotating speeds and the like for the left-side wheel 3 and the right-side wheel 4 of the music reproducing robot apparatus; left-side rotating body instruction values and right-side rotating body instruction values for instructing the respective rotating directions, rotating speeds, rotating angles and the like for the left-side rotating body 10 and the right-side rotating body 15; left-side opening/closing body instruction values and right-side opening/closing body instruction values for instructing the respective opening/closing angles, opening/closing speeds and the like for the left-side opening/closing body 12 and the right-side opening/closing body 17; and left-side light emission instruction values and right-side light emission instruction values for instructing the respective light emission conditions (e.g., color, brightness) for the left-side light emission unit 13 and the right-side light emission unit 14, along the reproduction time axis AX1 of the musical data to be transferred.

In this manner, the data transfer device 21 obtains the drive information INF2 for driving the drive units (i.e., the left-side wheel 3 and the right-side wheel 4, the left-side rotating body 10 and the right-side rotating body 15, the left-side opening/closing body 12 and the right-side opening/closing body 17, the left-side light emission unit 13 and the right-side light emission unit 14) of the music reproducing robot apparatus 1 according to the strains of the music based on the musical data. Incidentally, the drive information INF2 shown in FIG. 4 represents the respective left-side opening/closing body instruction values and right-side opening/closing body instruction values for the left-side opening/closing body 12 and the right-side opening/closing body 17.

In response to, for example, a transfer operation by the user, the data transfer device 21 transfers the musical data to be transferred and the drive information INF2 corresponding to the musical data to the music reproducing robot apparatus 1 sequentially through a USB (Universal Serial Bus) cable 25 and a cradle 26 on which the music reproducing robot apparatus 1 is mounted.

(3) Circuit Configuration in the Inside of Music Reproducing Robot Apparatus

Figure 5:
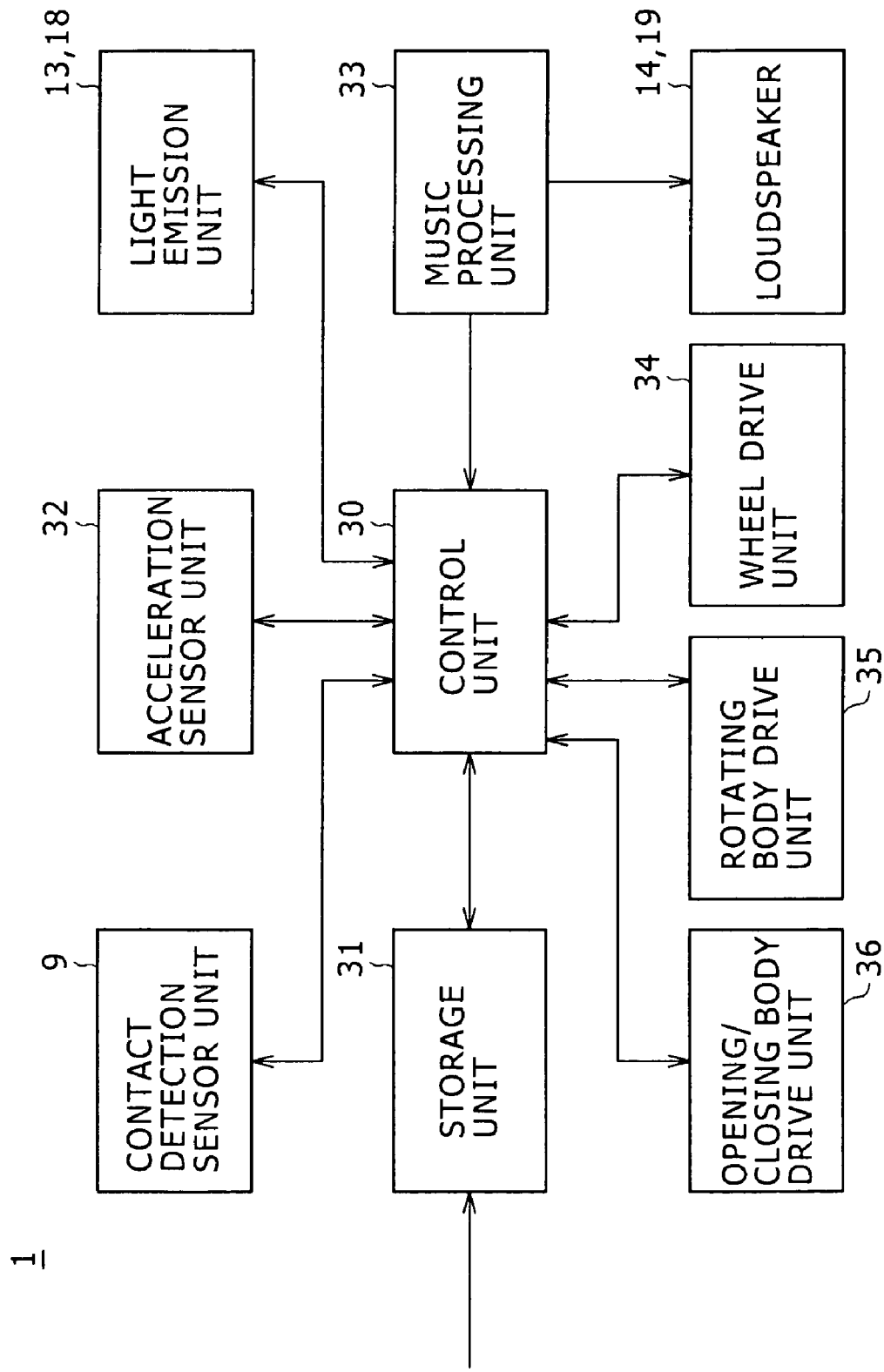
FIG. 5 is a block diagram showing a circuit configuration of the music reproducing robot apparatus.

Now, using FIG. 5, each of circuit parts provided inside the music reproducing robot apparatus 1 will be described. Each of the circuit parts in the music reproducing robot apparatus 1 is generalizedly controlled by a control unit 30, which itself is a circuit part. The control unit 30 executes various processings according to a program written in a storage unit 31 including, for example, a hard disc or the like. By this, the control unit 30 writes into the storage unit 31 the musical data and the drive information INF2 corresponding to the musical data which are transferred, for example, from the, external data transfer device 21 sequentially through the USB cable 25 and the cradle 26.

Then, upon recognizing that the music reproducing robot apparatus 1 has been parted from the cradle 26, the control unit 30 enters a stand-by mode in which it stands by until the ellipsoidal casing 2 is lifted up.

Figure 6:
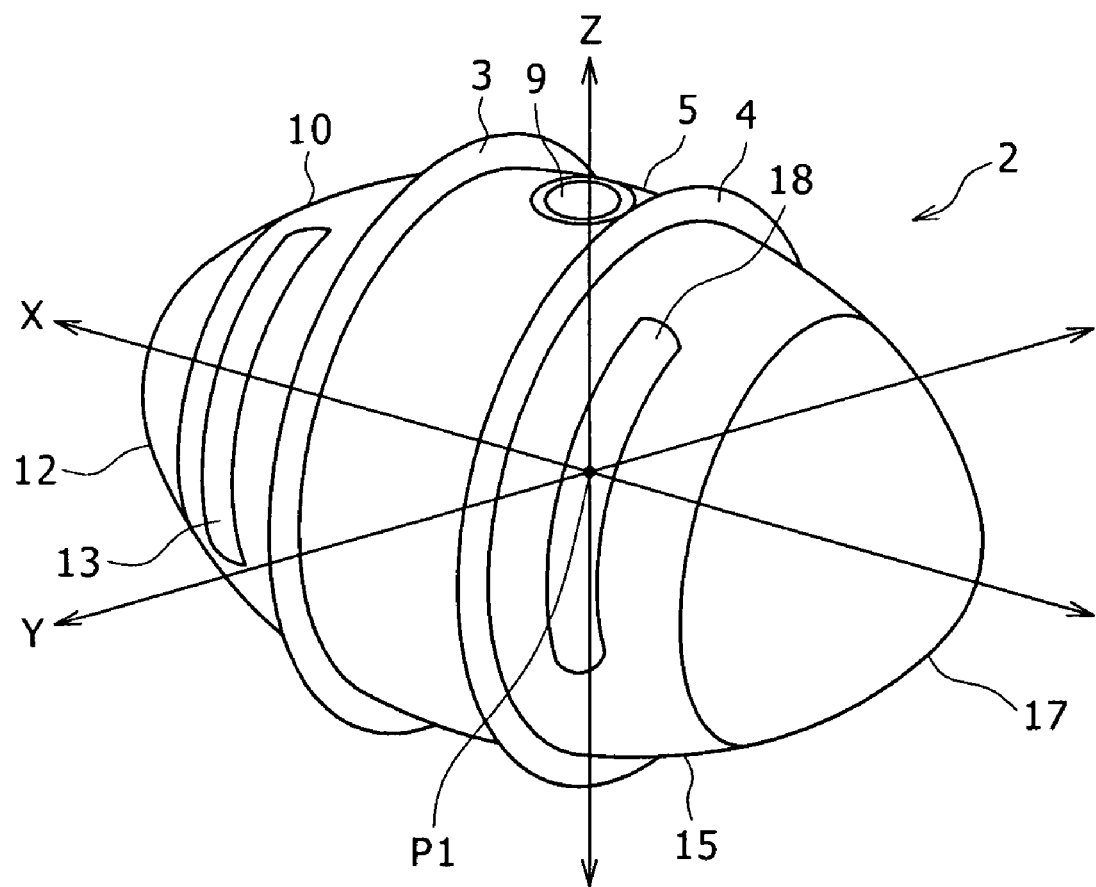
FIG. 6 is a schematic diagram showing the manner in which acceleration is detected by an acceleration sensor unit.

The music reproducing robot apparatus 1 is provided, as a circuit part, with an acceleration sensor unit 32 for detecting the orientation in which the ellipsoidal casing 2 is lifted up. As shown in FIG. 6, the acceleration sensor unit 32 detects respective acceleration values along three axes (X axis, Y axis and Z axis) of a rectangular coordinate system having an origin at the center P1 of the ellipsoidal casing 2, and sends the respective detection results to the control unit 30 as an X-axis detected acceleration value, a Y-axis detected acceleration value and an Z-axis detected acceleration value.

Here, the X axis is an axis coinciding with or parallel to the horizontal rotational axis L1 (FIG. 1) of the ellipsoidal casing 2, and is used for detecting the acceleration in the left-right direction of the ellipsoidal casing 2. In addition, the Z axis is an axis parallel to the vertical direction when the music reproducing robot apparatus 1 is in the standard posture, and the Z axis is used for detecting the acceleration in the vertical (up-down) direction of the music reproducing robot apparatus 1. Further, the Y axis is an axis parallel to the front-rear direction when the music reproducing robot apparatus 1 is in the standard posture, and the Y axis is used for detecting the acceleration in the front-rear direction of the music reproducing robot apparatus 1. Incidentally, here, a positive acceleration value along the X axis indicates an acceleration being generated in the rightward direction of the ellipsoidal casing 2, a negative acceleration value along the X axis indicates an acceleration being generated in the leftward direction of the ellipsoidal casing 2, a positive acceleration value along the Y axis indicates an acceleration being generated in the forward direction of the ellipsoidal casing 2, a negative acceleration value along the Y axis indicates an acceleration being generated in the rearward direction of the ellipsoidal casing 2, a positive acceleration value along the Z axis indicates an acceleration being generated in the upward direction of the ellipsoidal casing 2, and a negative acceleration value along the Z axis indicates an acceleration being generated in the downward direction of the ellipsoidal casing 2.

The music reproducing robot apparatus 1 stores, for example in the storage unit 31, the acceleration values along the X axis, the Y axis and the Z axis obtained where it is stopped in the standard posture (these acceleration values will be referred to also as the X-axis reference acceleration value, the Y-axis reference acceleration value and the Z-axis reference acceleration value), respectively as X-axis reference acceleration information, Y-axis reference acceleration information and Z-axis reference acceleration information. Here, the X-axis reference acceleration information, the Y-axis reference acceleration information and the Z-axis reference acceleration information include not only the X-axis reference acceleration value, the Y-axis reference acceleration value and the Z-axis reference acceleration value but also allowable ranges of these reference acceleration values, taking into account the fact that the floor surface on which the music reproducing robot apparatus 1 is placed is not always a perfectly horizontal surface, detection errors of the acceleration sensor unit 32, and the like.

When the X-axis detected acceleration value, Y-axis detected acceleration value and Z-axis detected acceleration value are sent from the acceleration sensor unit 32, the control unit 30 compares these detected acceleration values with the corresponding X-axis reference acceleration value, Y-axis reference acceleration value and Z-axis reference acceleration value, respectively.

As a result, if the X-axis detected acceleration value, Y-axis detected acceleration value and Z-axis detected acceleration value are within the allowable ranges of the corresponding X-axis reference acceleration value, Y-axis reference acceleration value and Z-axis reference acceleration value, the control unit 30 judges that the music reproducing robot apparatus 1 is in the state of being stopped in the standard posture. On the other hand, if the X-axis detected acceleration value, Y-axis detected acceleration value and Z-axis detected acceleration value are out of the allowable ranges, the control unit 30 judges that the music reproducing robot apparatus 1 is not in the state of being stopped in the standard posture, due to lifting up thereof by the user, for example.

Figure 7A:
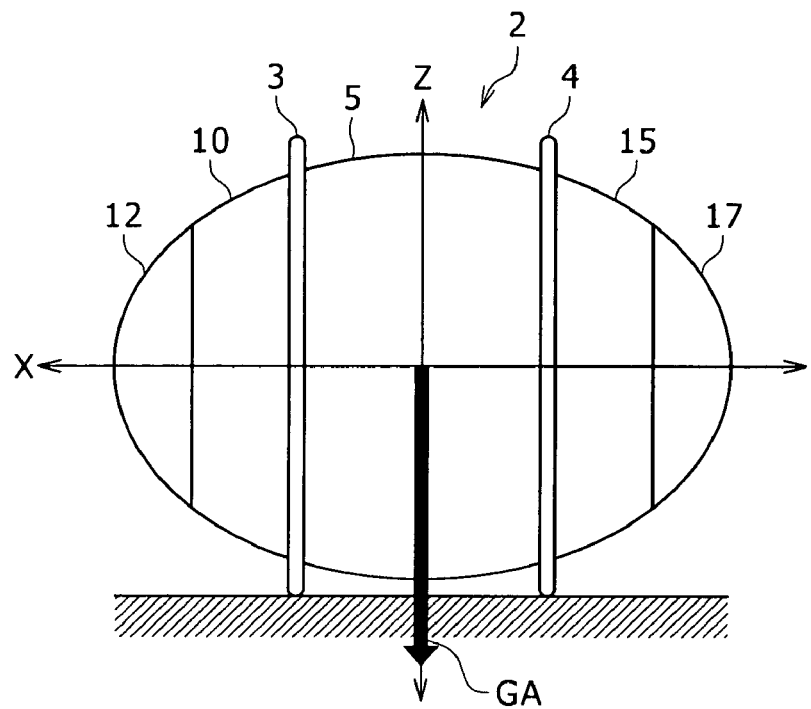
FIGS. 7A and 7B are schematic diagrams showing the manner in which gravitational acceleration varies when an ellipsoidal casing is lifted up.

In practice, where the music reproducing robot apparatus 1 is stopped as shown in FIG. 7A, the acceleration generated in the music reproducing robot apparatus 1 is substantially only the gravitational acceleration GA. In addition, where the music reproducing robot apparatus 1 is in the standard posture, substantially all the value of the gravitational acceleration GA appears as the acceleration value along the Z axis, and, in this instance, the acceleration value along the X axis and the acceleration value along the Y axis are substantially "0." In other words, the acceleration values along the X-axis, Y-axis and Z-axis in this condition are stored in the storage unit 31 as the X-axis reference acceleration value, Y-axis reference acceleration value and Z-axis reference acceleration value.

Figure 7B:
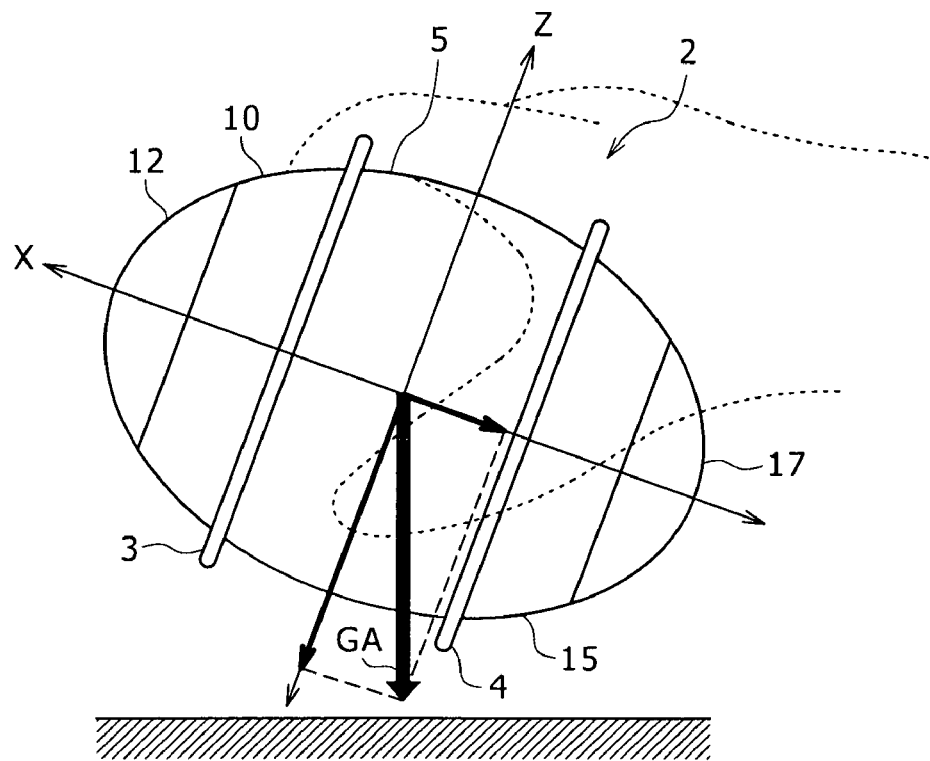

When the music reproducing robot apparatus 1 having been stopped in the standard posture is lifted up by a user's hand, for example, as shown in FIG. 7B, the ellipsoidal casing 2 is inclined to the right side or the left side, whereby the gravitational acceleration GA having appeared only along the Z axis is dispersed into components along the Z axis and the X axis. Namely, when the ellipsoidal casing 2 is inclined from the standard posture by being lifted up by the user's hand, the component in the X axis direction of the gravitational acceleration GA appears as an acceleration value along the X axis.

In this case, when it is judged from the results of detection by the acceleration sensor unit 32 that the X-axis detected acceleration value has come out of the allowable range of the X-axis reference acceleration value, the control unit 30 judges that the ellipsoidal casing 2 has been lifted by the user. When it is thus recognized that the ellipsoidal casing 2 has been lifted up, the control unit 30 shifts from the stand-by mode into a command inputting mode for receiving, through turning operations of the left-side wheel 3 and the right-side wheel 4 or the like, inputs of commands given to the music reproduction robot apparatus 1.

The control unit 30 having entered the command inputting mode first judges the orientation in which the ellipsoidal casing 2 is inclined, based on the sign of the X-axis detected acceleration value. Specifically, when the sign of the X-axis detected acceleration value is positive, the control unit 30 judges that the ellipsoidal casing 2 is so inclined that the left-side wheel 3 and the left-side casing 6 thereof are located on the upper side (i.e., on the side opposite to the side of the orientation of gravity) and the right-side wheel 4 and the right-side casing 7 thereof are on the lower side (i.e., on the side of the orientation of gravity), as for example shown in FIG. 8A. On the other hand, when the sign of the X-axis detected acceleration value is negative, the control unit 30 judges that the ellipsoidal casing 2 is so inclined that the left-side wheel 3 and the left-side casing 6 thereof are located on the lower side and the right-side wheel 4 and the right-side casing 7 thereof are located on the upper side, as for example shown in FIG. 8B.

Upon judging that the ellipsoidal casing 2 is so inclined that, for example, the left-wide wheel 3 is on the upper side and the right-side wheel 4 is on the lower side, the control unit 30 assigns a tune selecting command for selecting the musical data (tune) to be reproduced to an input made by a turning operation on the left-side wheel 3 located on the upper side, and assigns a volume control command for controlling the output sound volume of the musical data to an input made by a turning operation on the right-side wheel 4. On the other hand, upon judging that the ellipsoidal casing 2 is so inclined that the right-side wheel 4 is on the upper side and the left-side wheel 3 is on the lower side, the control unit 30 assigns the tune selecting command to an input made by a turning operation on the right-side wheel 4 located on the upper side, and assigns the volume control command to an input made by a turning operation on the left-side wheel 3 located on the lower side.

Thus, in the command inputting mode, the control unit 30 assigns the tune selecting command to the input made by turning the wheel located on the upper side, and assigns the volume control command to the input made by turning the wheel located on the lower side.

Besides, in the command inputting mode, according to predetermined operations (e.g., an operation of touching the detection area of the contact detection sensor unit 9 with a finger, or the like) conducted by the user, the control unit 30 performs such a control that musical data stored in the storage unit 31 is read, the musical data thus read is subjected to reproducing processings such as digital-to-analog conversion and amplification by the music processing unit 33 to convert the musical data into a musical signal, and a piece of music based on the musical signal is outputted through the loudspeakers 14 and 15.

Further, when the left-side wheel 3 or the right-side wheel 4 is rotated, for example, by a user's finger, the control unit 30 performs a processing according to the command assigned to the input made by operating the left-side wheel 3 or the right-side wheel 4. For example, when the left-side wheel 3 located on the upper side is rotated, the control unit 3 accepts the rotating direction and the rotation amount as inputs, and converts the inputs into a tune selecting command for reading and reproducing the musical data (tune) next to or precedent to the musical data (tune) being reproduced, to thereby perform a tune selecting processing. Besides, when the right-side wheel 4 on the lower side is rotated, the control unit 30 accepts the rotating direction and the rotation amount as inputs, and converts the inputs into a volume control command for increasing or decreasing the output sound volume of the musical data being reproduced, to thereby perform a volume controlling processing.

In this manner, in the command inputting mode, the control unit 30 accepts the turning operations on the left-side wheel 3 and the right-side wheel 4 by the user as inputs, converts the inputs into a command assigned according to the positional relationships (on the upper side or the lower side) of the left-side wheel 3 and the right-side wheel 4, and executes a processing according to the command.

Thereafter, when it is recognized from the results of detection by the acceleration sensor unit 32 that the ellipsoidal casing 2 is again placed on a floor and put in the standard posture by the user, the control unit 30 makes a transition from the current command inputting mode into an automatic driving mode for driving each of component parts of the music reproducing robot apparatus 1 according to the musical data being reproduced.

In practice, the control unit 30 in the automatic driving mode performs a strain-synchronous control processing for controlling each of the component parts of the ellipsoidal casing 2 synchronously with the strains (tempo, musical intervals, etc.) of the music based on the musical data being reproduced. In this case, the control unit 30 reads drive information INF2 corresponding to the musical data being reproduced from the storage unit 31, and controls the wheel drive unit 34, the rotating body drive unit 35, the opening/closing body drive unit 36, the left-side light emission unit 13 and the right-side light emission unit 18, based on the drive information INF2 read.

As a result, the wheel drive unit 34 drives the left-side wheel 3 and the right-side wheel 4 to rotate synchronously with the strains of the music based on the musical data being reproduced. By this, the control unit 30 can cause the ellipsoidal casing 2 to run on a floor in synchronism with the strains of the music being outputted from the loudspeakers 14, 19.

In addition, under the control of the control unit 30, the rotating body drive unit 35 drives the left-side rotating body 10 and the right-side rotating body 15 to rotate synchronously with the strains of the music based on the musical data being reproduced. This ensures that the control unit 30 can cause the left-side casing 6 and the right-side casing 7 to rotate in synchronism with the strains of the music being outputted from the loudspeakers 14, 19.

Further, under the control of the control unit 30, the opening/closing body drive unit 36 drives the left-side opening/closing body 12 and the right-side opening/closing body 17 to open and close synchronously with the strains of the music based on the musical data being reproduced. This ensures that the control unit 30 can cause the left-side opening/closing body 12 and the right-side opening/closing body 17 to open and close in synchronism with the strains of the music being outputted from the loudspeakers 14, 19.

Furthermore, under the control of the control unit 30, the left-side light emission unit 13 and the right-side light emission unit 18 emit light in various light emission conditions in synchronism with the strains of the music based on the musical data being reproduced. This ensures that the control unit 30 can cause light emission in synchronism with the strains of the music being outputted from the loudspeakers 14, 19.

In this manner, during the automatic driving mode, the music reproducing robot apparatus 1 can move around on a floor, as if it were dancing, in tune with the music being outputted from the loudspeakers 14, 19, with the result that entertainment properties can be remarkably enhanced.

Figure 9:
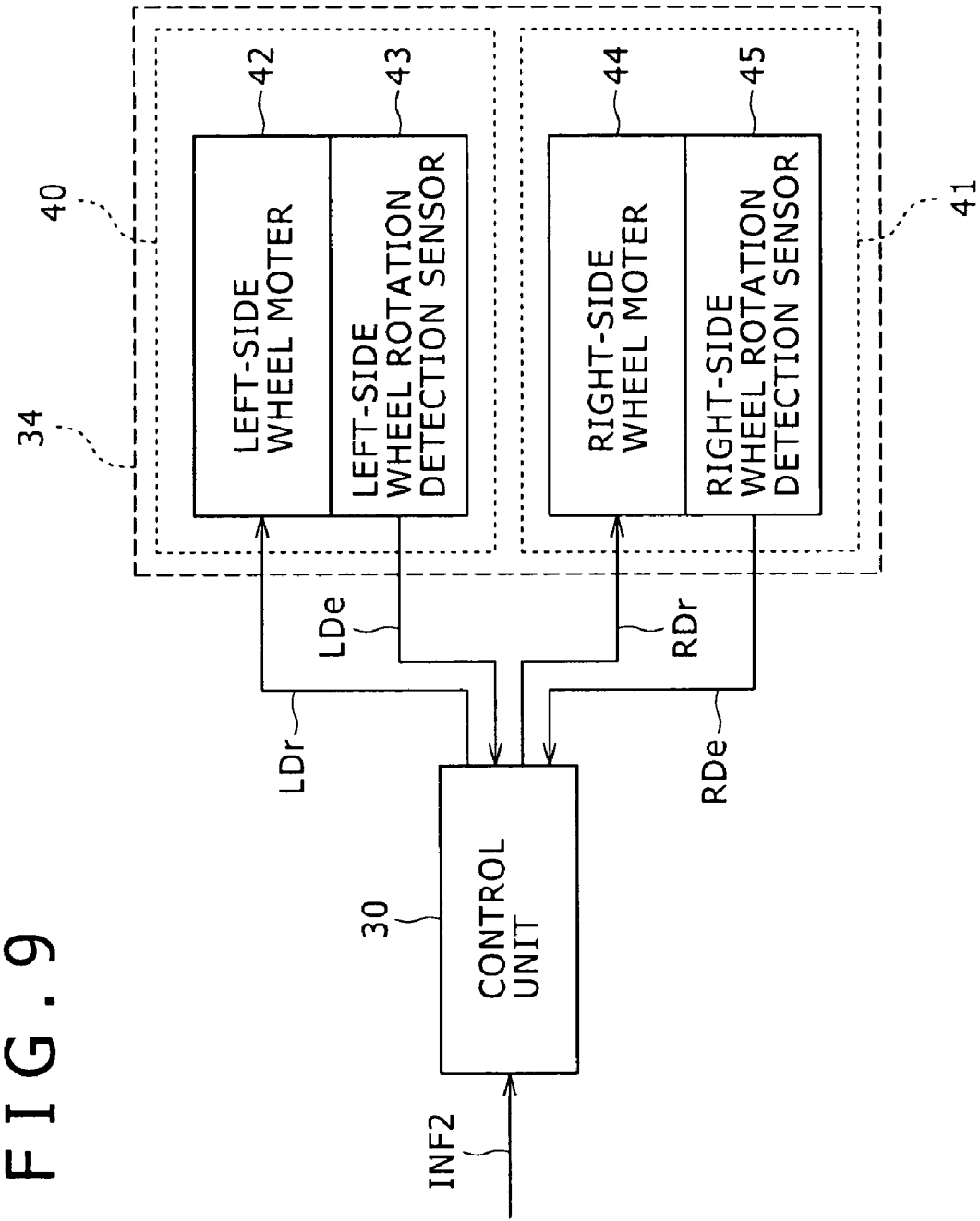
FIG. 9 is a block diagram showing a circuit configuration of a wheel drive unit.

Now, the circuit configuration of the wheel drive unit 34 will be described in detail below, referring to FIG. 9. The wheel drive unit 34 has a left-side wheel drive mechanism 40 for turning the left-side wheel 3, and a right-side wheel drive mechanism 41 for turning the right-side wheel 4.

The left-side wheel drive mechanism 40 is provided with a left-side wheel motor 42 for rotating the left-side wheel 3 in one direction D1 and the other direction D2 about an axis, and a left-side wheel rotation detection sensor 43 composed, for example, of a rotary encoder for detecting the rotating direction, rotation amount and rotating speed with respect to an output shaft of the left-side wheel motor 42. Similarly, the right-side wheel drive mechanism 41 is provided with a right-side wheel motor 44 for rotating the right-side wheel 4 in one direction D1 and the other direction D2 about an axis, and a right-side wheel rotation detection sensor 45 composed, for example, of a rotary encoder for detecting the rotating direction, rotation amount and rotating speed with respect to an output shaft of the right-side wheel motor 44.

In practice, during the automatic driving mode, the control unit 30 first produces, based on left-side wheel drive instruction values contained in the drive information INF2 read from the storage unit 31, a left-side wheel drive signal LDr for rotating the output shaft of the left-side wheel motor 42 in the left-side wheel drive mechanism 40 under the conditions of the rotating direction, rotation amount and rotating speed indicated by the left-side wheel drive instruction values, and sends the left-side wheel drive signal LDr to the left-side wheel motor 42. The left-side wheel motor 42 rotates its output shaft according to the left-side wheel dive signal LDr, and the rotation of the output shaft is transmitted to the left-side wheel 3, thereby rotating the left-side wheel 3. When the output shaft of the left-side wheel motor 42 begins to rotate, the left-side wheel rotation detection sensor 43 sends to the control unit 30 a left-side wheel rotation detection signal LDe indicating the rotating direction, rotation amount and rotating speed with respect to the output shaft of the left-side wheel motor 42.

Here, based on the left-side wheel rotation detection signal LDe sent from the left-side wheel rotation detection sensor 43, the control unit 30 produces left-side wheel rotation detected values indicating the rotating direction, rotation amount and rotating speed with respect to the output shaft of the left-side wheel motor 42 at that time. Further, here, the control unit 30 compares the left-side wheel drive instruction values being used for the rotation of the left-side wheel 3 with the left-side wheel rotation detected values, then, based on the differential values obtained as a result of the comparison, produces a left-side wheel drive signal LDr for rotating the output shaft of the left-side wheel motor 42 under the conditions of the rotating direction, rotation amount and rotating speed indicated by the differential values, and sends the left-side wheel drive signal LDr to the left-side wheel motor 42.

Thus, in the automatic driving mode, the control unit 30 performs a feedback control over the left-side wheel motor 42 by building up a feedback loop between the left-side wheel motor 42 and the rotation detection sensor 43.

In addition, based on right-side wheel drive instruction values contained in the drive information INF2 read from the storage unit 31, the control unit 30 produces a right-side wheel drive signal RDr for rotating the output shaft of the right-side wheel motor 44 in the right-side wheel drive mechanism 41 under the conditions of the rotating direction, rotation amount and rotating speed indicated by the right-side wheel drive instruction values, and sends the right-side wheel drive signal RDr to the right-side wheel motor 44. The right-side wheel motor 44 rotates its output shaft according to the right-side wheel dive signal RDr, and the rotation of the output shaft is transmitted to the right-side wheel 4, thereby rotating the right-side wheel 4. When the output shaft of the right-side wheel motor 44 begins to rotate, the right-side wheel rotation detection sensor 45 sends to the control unit 30 a right-side wheel rotation detection signal RDe indicating the rotating direction, rotation amount and rotating speed with respect to the output shaft of the right-side wheel motor 44.

Here, based on the right-side wheel rotation detection signal RDe sent from the right-side wheel rotation detection sensor 45, the control unit 30 produces right-side wheel rotation detected values indicating the rotating direction, rotation amount and rotating speed with respect to the output shaft of the right-side wheel motor 44 at that time. Further, here, the control unit 30 compares the right-side wheel drive instruction values being used for the rotation of the right-side wheel 4 with the right-side wheel rotation detected values, then, based on the differential values obtained as a result of the comparison, produces a right-side wheel drive signal RDr for rotating the output shaft of the right-side wheel motor 44 under the conditions of the rotating direction, rotation amount and rotating speed indicated by the differential values, and sends the right-side wheel drive signal RDr to the right-side wheel motor 44.

Thus, like in the case of the left-side wheel drive mechanism 40, the control unit 30 performs a feedback control over the right-side wheel motor 44 by building up a feedback loop between the right-side wheel motor 44 and the rotation detection sensor 45.

In this manner, the control unit 30 controls individually the left-side wheel motor 42 and the right-side wheel motor 44 so as to rotate the left-side wheel 3 and the right-side wheel 4, whereby the ellipsoidal casing 2 can be caused to run rectilinearly in the front-rear direction, to run in the manner of rotating in the current site, and to run in the manner of turning to the left or the right.

In addition, in the command inputting mode, the control unit 30 first does not read the drive information INF2, whereby it causes none of the left-side wheel motor 42 and the right-side wheel motor 44 to rotate, but, instead, it waits to receive a user's turning operation or operations on the left-side wheel 3 and the right-side wheel 4. Incidentally, it is assumed in this instance that the ellipsoidal casing 2 is lifted up by the user at such an inclination that the left-wide wheel 3 is on the upper side and the right-side wheel 4 is on the lower side, as shown in FIG. 8A, as an example.

Here, when the left-side wheel 3 is rotated by the user, the output shaft of the left-side wheel motor 42 is rotated accordingly, whereon the left-side wheel rotation sensor 43 produces a left-side wheel rotation detection signal LDe, and sends it to the control unit 30.

Based on the left-side wheel rotation detection signal LDe sent from the left-side wheel rotation detection sensor 43, the control unit 30 recognizes a user's turning operation (i.e., the rotating direction, rotation amount and rotating speed of the left-side wheel 3) on the left-side wheel 3 located on the upper side, accepts the turning operation as inputs, and converts the inputs into a tune selecting command assigned to the inputs made by operating the wheel on the upper side. Then, the control unit 30 performs the above-mentioned tune selecting processing according to the tune selecting command.

Besides, in this instance, based on the left-side wheel rotation detection signal LDe, the control unit 30 produces a left-side wheel drive signal LDr for returning the left-side wheel 3 rotated by the user to the position before the rotation, and sends the signal to the left-side wheel motor 42. This ensures that a force tending to rotate the left-side wheel 3 in the direction opposite to the direction of the user's turning operation is exerted on the left-side wheel 3.

As a result, for example when the left-side wheel 3 is rotated by a user's finger and thereafter the user's finger is put off the left-side wheel 3 and the external force having been exerted on the left-side wheel 3 by the user's finger is removed, the left-side wheel 3 is rotated in the direction opposite to the direction of the rotation by the user's finger, to be returned to the position before the rotation. On the other hand, for example when the left-side wheel 3 is rotated by a user's finger and thereafter the user's finger is kept in contact with the left-side wheel 3 and the application of the external force to the left-side wheel 3 by the user's finger is continued in order to maintain the position after the rotation, the force tending to rotate the left-side wheel 3 in the direction opposite to the direction of the rotation by the user's finger balances with the external force exerted by the user's finger, with the result that the left-side wheel 3 is maintained in the position upon the rotation.

Thus, the control unit 30 controls the left-side wheel drive mechanism 40 so that a force tending to rotate the left-side wheel 3 in the direction opposite to the direction of a turning operation applied to the left-side wheel 3 by the user's finger is exerted on the left-side wheel 3, which permits the user to turn the left-side wheel 3 while getting a sensation like that in operating a spring-biased dial.

On the other hand, when the right-side wheel 4 is rotated by the user, the output shaft of the right-side wheel motor 44 is rotated accordingly, whereon the right-side wheel rotation sensor 45 produces a right-side wheel rotation detection signal RDe, and sends it to the control unit 30.

Based on the right-side wheel rotation detection signal RDe sent from the right-side wheel rotation detection sensor 45, the control unit 30 recognizes a user's turning operation (i.e., the rotating direction, rotation amount and rotating speed of the right-side wheel 4) on the right-side wheel 4 located on the lower side, accepts the turning operation as inputs, and converts the inputs into a volume control command assigned to the inputs made by operating the wheel on the lower side. Then, the control unit 30 performs the above-mentioned volume control processing according to the volume control command.

In this instance, unlike the case of the left-side wheel 3, the control unit 30 does not exert on the right-side wheel 4 a force tending to rotate the right-side wheel 4 in the direction opposite to the direction of the user's turning operation. As a result, the sensation in operating the right-side wheel 4 is like that in operating a non-spring-biased dial which is simply rotated according to the user's turning operation; thus, the sensation in operating the right-side wheel 4 is different from that in operating the left-side wheel 3.

Thus, the control unit 30 controls the left-side wheel drive mechanism 40 and the right-side wheel drive mechanism 41 so that a sensation in operating the left-side wheel 3 on the upper side through which to input the tune selecting command and a sensation in operating the right-side wheel 4 on the lower side through which to input the volume control command are different from each other.

Incidentally, the case where the ellipsoidal casing 2 is lifted up by the user to be so inclined that the left-side wheel 3 is located on the upper side and the right-side wheel 4 is located on the lower side has been described here, as an example. In the case where the ellipsoidal casing 2 is lifted up at such an inclination that the right-side wheel 4 is located on the upper side and the left-side wheel 3 is located on the lower side, the tune selecting command is assigned to the input made by turning the right-side wheel 4 on the upper side, and a force in the direction opposite to the direction of the user's turning operation is exerted on the right-side wheel 4, whereas the volume control command is assigned to the input made by turning the left-side wheel 3 on the lower side, and a force in the direction opposite to the direction of the user's turning operation is not exerted on the left-side wheel 3.

In other words, irrespectively of the direction of inclination in which the ellipsoidal casing 20 is lifted up, the tune selecting command is assigned to the input made by operating the wheel on the upper side, and a force in the direction opposite to the direction of the user's turning operation is exerted on the wheel on the upper side, whereas the volume control command is assigned to the input made by operating the wheel on the lower side, and a force in the direction opposite to the direction of the user's turning operation is not exerted on the wheel on the lower side.

Now, the correspondence between the turning operations on the left-side wheel 3 and the right-side wheel 4 and the commands will be described more specifically. During the command inputting mode, upon recognizing on the basis of the left-side wheel rotation detection signal LDe sent from the left-side wheel rotation detection sensor 43 that the left-side wheel 3 has been rotated by a predetermined amount in one direction (e.g., clockwise) and thereafter returned to the position before the rotation, the control unit 3 accepts this turning operation as an input, and converts the input into a next-tune selecting command for selecting a tune next to the tune based on the musical data being reproduced. Then, the control unit 30 reads, and reproduces, the musical data of the tune next to the tune based on the musical data being reproduced, according to the next-tube selecting command.

In addition, upon recognizing on the basis of the left-side wheel rotation detection signal LDe sent from the left-side wheel rotation detection sensor 43 that the left-side wheel 3 has been rotated by a predetermined amount in the other direction (e.g., counterclockwise) and thereafter returned to the position before the rotation, the control unit 30 accepts the turning operation as an input, and converts the input into a preceding-tune selecting command for selecting a tune precedent to the tune based on the musical data being reproduced. Then, the control unit 30 reads, and reproduces, the musical data of the tune precedent to the tune based on the musical data being reproduced, according to the preceding-tune selecting command.

Further, upon recognizing on the basis of the left-side wheel rotation detection signal LDe that the left-side wheel 3 has been rotated by a predetermined amount in one direction (e.g., clockwise) and thereafter kept in the position after the rotation for a predetermined time by an external force exerted by a user's finger, the control unit 30 converts the input made by this turning operation into a successive next-tune selecting command for successively selecting the next tune, the next but one tune, and so on in relation to the tune based on the musical data being reproduced. According to the successive next-tune selecting command, the control unit 30 successively selects the next tune, the next but one tune, and so on, during when the left-side wheel 3 is kept in the position after the rotation. Then, upon recognizing on the basis of the left-side wheel rotation detection signal LDe that the left-side wheel 3 has returned to its position before the rotation, the control unit 30 reads, and reproduces, the musical data of the tune being selected at that moment.

Furthermore, upon recognizing on the basis of the left-side wheel rotation detection signal LDe that the left-side wheel 3 has been rotated by a predetermined amount in the other direction (e.g., counterclockwise) and thereafter kept in the position after the rotation for a predetermined time by an external force exerted by a user's finger, the control unit 30 converts the input made by this turning operation into a successive preceding-tune selecting command for successively selecting the preceding tune, the preceding but one tune, and so on in relation to the tune based on the musical data being reproduced. According to the successive preceding-tune selecting command, the control unit 30 successively selects the preceding tune, the preceding but one tune, and so on, during when the left-side wheel 3 is kept in the position after the rotation. Then, upon recognizing on the basis of the left-side wheel rotation detection signal LDe that the left-side wheel 3 has returned to its position before the rotation, the control unit 30 reads, and reproduces, the musical data of the tune being selected at that moment.

Still further, upon recognizing on the basis of the right-side wheel rotation detection signal RDe sent from the right-side wheel rotation detection sensor 45 that the right-side wheel 4 has been rotated by a predetermined amount in one direction (e.g., clockwise), the control unit 30 accepts this turning operation as an input, and converts the input into a volume increasing command for increasing the output sound volume of the musical data being reproduced. Then, the control unit 30 controls the music processing unit 33 according to the volume increasing command, thereby increasing the output sound volume of the musical data being reproduced.

Still furthermore, upon recognizing on the basis of the right-side wheel rotation detection signal RDe sent from the right-side wheel rotation detection sensor 45 that the right-side wheel 4 has been rotated by a predetermined amount in the other direction (e.g., counterclockwise), the control unit 30 accepts this turning operation as an input, and converts the input into a volume decreasing command for decreasing the output sound volume of the musical data being reproduced. Then, the control unit 30 controls the music processing unit 33 according to the volume decreasing command, thereby decreasing the output sound volume of the musical data being reproduced.

In this way, the control unit 30 performs the tune selecting command assigned to the turning operation on the wheel on the upper side (here, the left-side wheel 3) and the volume control command assigned to the turning operation on the wheel on the lower side (here, the right-side wheel 4), according to the turning operations on the wheel on the upper side and the wheel on the lower side.

(4) Command Assigning Procedure

Now, the procedure of the processing of assigning commands to the inputs made by operating the left-side wheel 3 and the right-side wheel 4 as above-mentioned (hereinafter, this processing will be referred to also as command assigning processing) will be described referring to the flowchart shown in FIG. 10. Incidentally, the command assigning processing is executed by the control unit 30 in the music reproducing robot apparatus 1, following a program installed in the storage unit 31 or the like.

Figure 10:
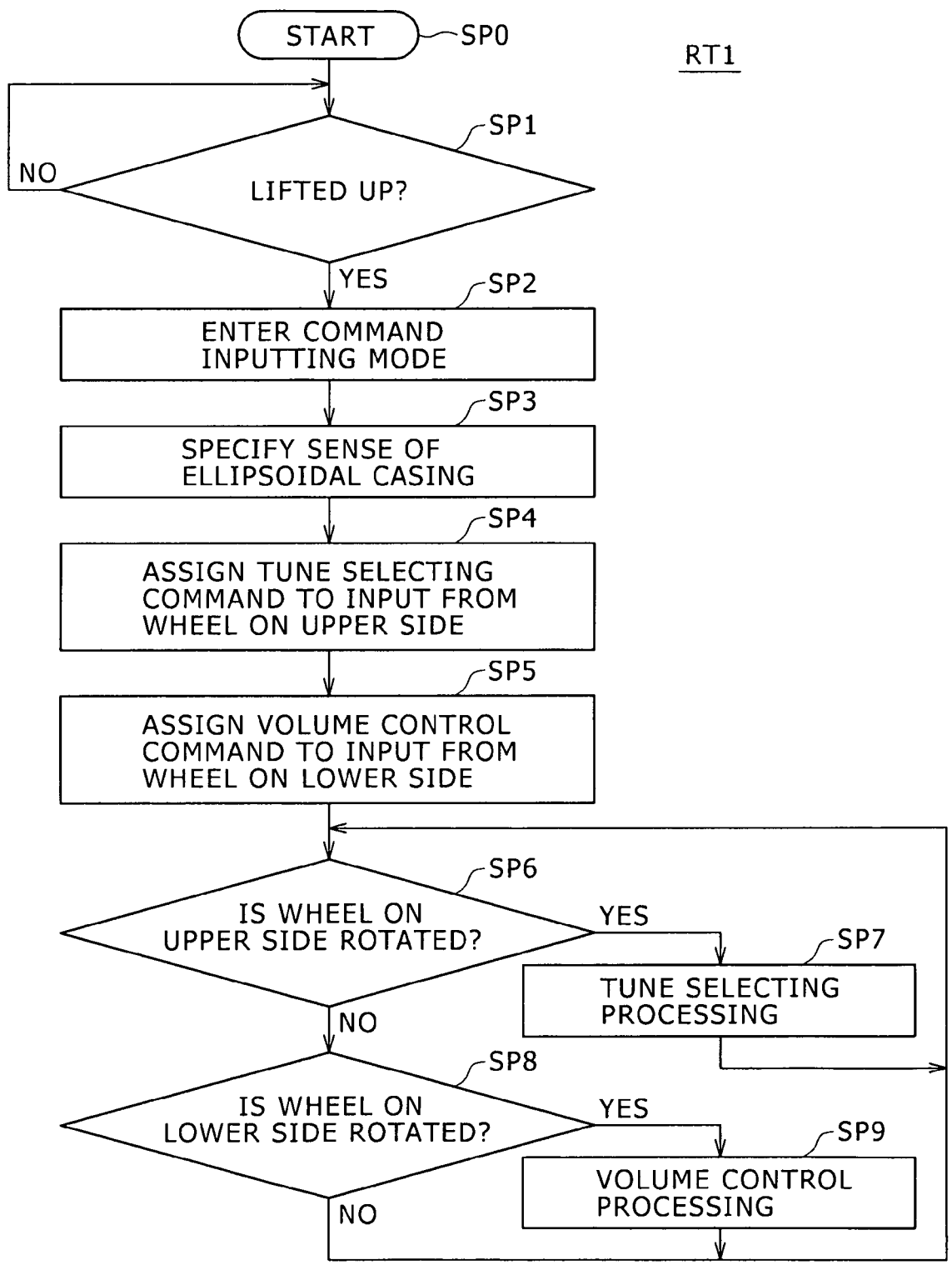
FIG. 10 is a flowchart showing a command assigning procedure.

As shown in FIG. 10, for example when the ellipsoidal casing 2 is put off the cradle 26, the control unit 30 in the music reproducing robot apparatus 1 enters the stand-by mode, and begins to execute a command assigning procedure RT1 starting from START step SP0, followed by entering step SP1.

In step SP1, based on the results of detection by the acceleration sensor unit 32, the control unit 30 waits until the ellipsoidal casing 2 is lifted up. Then, upon recognizing based on the results of detection by the acceleration sensor unit 32 that the ellipsoidal casing 2 has been lifted up, the control unit 30 enters step SP2.

In step SP2, the control unit 30 shifts from the stand-by mode into a command inputting mode, and enters the next step SP3. In step SP3, the control unit 30 specifies the orientation of the ellipsoidal casing 2, based on the results of detection by the acceleration sensor unit 32. Specifically, the control unit 30 specifies in step SP3 that, for example, the ellipsoidal casing 2 is in such an orientation that the left-side wheel 3 is on the upper side and the right-side wheel 4 is on the lower side, and thereafter enters step SP4.

In step SP4, the control unit 30 assigns the tune selecting command to an input made by operating the left-side wheel 3 on the upper side at this moment, and then enters the next step SP5. In step SP5, the control unit 30 assigns the volume control command to an input made by operating the right-side wheel 4 on the lower side at this moment, and then enters the next step SP6.

In step SP6, the control unit 30 judges whether or not the left-side wheel 3 has been rotated, based on the left-side wheel rotation detection signal LDe sent from the left-side wheel rotation detection sensor 43. When an affirmative result (YES) is obtained in step SP6, it means that the left-side wheel 3 has been turned by the user, whereon the control unit 30 enters step SP7.

In step S7, based on the left-side wheel rotation detection signal LDe, the control unit 30 recognizes a turning operation (the rotating direction, rotation amount and rotating speed) applied to the left-side wheel 3 located on the upper side, accepts the turning operation as an input, and converts this input into a tune selecting command assigned to an input from the wheel on the upper side. Then, the control unit 30 performs the above-mentioned tune selecting processing according to the tune selecting command, and thereafter returns into step SP6 to wait for a turning operation being applied to the left-side wheel 3.

On the other hand, when a negative result (NO) is obtained in the above-mentioned step SP6, it means that the left-side wheel 3 has not been turned by the user, whereon the control unit 30 enters step SP8.

In step SP8, the control unit 30 judges whether or not the right-side wheel 4 has been rotated, based on the right-side wheel rotation detection signal RDe sent from the right-side wheel rotation detection sensor 45. When an affirmative result (YES) is obtained in step SP8, it means that the right-side wheel 4 has been turned by the user, whereon the control unit 30 enters step SP9.

In step SP9, based on the right-side wheel rotation detection signal RDe, the control unit 30 recognizes a turning operation (the rotating direction, rotation amount and rotating speed) applied to the right-side wheel 4 located on the lower side, accepts this turning operation as an input, and converts this input into a volume control command assigned to an input from the wheel on the lower side. Then, the control unit 30 performs the above-mentioned volume controlling processing according to the volume control command, and thereafter returns into step SP6 to wait for a turning operation being given to the left-side wheel 3.

On the other hand, when a negative result (NO) is obtained in the above-mentioned step SP8, it means that the right-side wheel 4 has not been turned by the user, and, in this case also, the control unit 30 returns into step SP6 to wait for a turning operation being given to the left-side wheel 3.

Following the command assigning procedure RT1 as above, the control unit 30 assigns the tune selecting command or the volume control command to the inputs made by operating the left-side wheel 3 and the right-side wheel 4, according to the positional relationships (on the upper side or the lower side) of the left-side wheel 3 and the right-side wheel 4. While omitted in the description of the command assigning procedure RT1, when it is recognized that the ellipsoidal casing 2 has been again placed on the floor after the command inputting mode was entered and the musical data was reproduced, the control unit 30 shifts into the automatic driving mode.

(5) Operation and Effects

In the above-described configuration, the control unit 30 of the music reproducing robot apparatus 1 waits, in the standby mode, for the ellipsoidal casing 2 being lifted up. Then, upon recognizing on the basis of the results of detection by the acceleration sensor unit 32 that the ellipsoidal casing 2 has been lifted up, the control unit 30 enters the command inputting mode.

Upon entering the command inputting mode, the control unit 30 judges the orientation of the ellipsoidal casing 2 being lifted up, based on the results of detection by the acceleration sensor unit 32, and recognizes the positional relationships of the left-side wheel 3 and the right-side wheel 4, i.e., which of the left-side wheel 3 and the right-side wheel 4 is on the upper side (the side opposite to the orientation of gravity) and which is on the lower side (the side of the orientation of gravity).

Where it is recognized that, for example, the left-side wheel 3 is on the upper side and the right-side wheel 4 is on the lower side, the control unit 30 assigns the tune selecting command to an input made by turning the left-side wheel 3 on the upper side, and assigns the volume control command to an input made by turning the right-side wheel 4 on the lower side. On the other hand, where it is recognized that, for example, the right-side wheel 4 is on the upper side and the left-side wheel 3 is on the lower side, the control unit 30 assigns the tune selecting command to an input made by turning the right-side wheel 4 on the upper side, and assigns the volume control command to an input made by turning the left-side wheel 3 on the lower side.

This permits the music reproducing robot apparatus 1 to assign the tune selecting command to the input made by operating the wheel on the upper side as viewed from the user and to assign the volume control command to the input made by operating the wheel on the lower side as viewed from the user, regardlessly of the orientation in which the ellipsoidal casing 2 is lifted up. Therefore, even in the case of a casing having a shape symmetrical on the upper and lower sides and on the left and right sides, such as an ellipsoid, and being lifted up by the user in an orientation which is not necessarily a fixed orientation, the user is permitted to carry out inputting operations always by the same operating method, regardless of the orientation in which the casing is lifted up.

In addition, when the wheel with the tune selecting command assigned to an input made by operation thereof, for example the left-side wheel 3, is rotated by the user after reproduction of musical data is started by a predetermined operation such as an operation of touching the detection area of the contact detection sensor unit 9, the control unit 30 controls he left-side wheel drive mechanism 40 operable to drive the left-side wheel 3, whereby a force tending to rotate the left-side wheel 3 in the direction opposite to the direction of the rotation by the user is exerted on the left-side wheel 3. On the other hand, when the right-side wheel 4 with the volume control command assigned to an input made by operation thereof is rotated by the user, the control unit 30 performs such a control that any rotating force in the direction opposite to the direction of the rotation by the user is not exerted on the right-side wheel 4.

With this configuration, the control unit 30 permits the user to turn the left-side wheel 3 for inputting the tune selecting command with a sensation similar to that in operating a spring-biased dial, and to turn the right-side wheel 4 for inputting the volume control command with a sensation similar to that in operating a non-spring-biased dial.

In this manner, the control unit 30 controls the left-side wheel drive mechanism 40 and the right-side wheel drive mechanism 41 so that the sensation in operating the wheel operable to input the tune selecting command (e.g., the left-side wheel 3) and the sensation in operating the wheel operable to input the volume control command (e.g., the right-side wheel 4) are different from each other. As a result, the user can discriminate the left-side wheel 3 and the right-side wheel 4, which are the same in shape and are indistinguishable in appearance, from each other by the operating sensations thereof, and the user can recognize the commands assigned to the inputs made respectively by operating the left-side wheel 3 and the right-side wheel 4, based on the respective sensations in operating the wheels 3, 4.

Further, when it is recognized based on the results of detection by the acceleration sensor unit 32 that the ellipsoidal casing 2 has been again placed on the floor so that the left-side wheel 3 and the right-side wheel 4 make contact with the floor after reproduction of musical data has been started in the command inputting mode, the control unit 30 shifts from the command inputting mode into the automatic driving mode.

The control unit 30 having entered the automatic driving mode controls the wheel drive unit 34 based on the drive information INF2 read from the storage unit 31, whereby the left-side wheel 3 and the right-side wheel 4 are respectively rotated synchronously with the strains of the music based on the musical data being reproduced, and the ellipsoidal casing 2 is caused to run accordingly.

In this manner, the music reproducing robot apparatus 1 behaves as follows. In the command inputting mode with the ellipsoidal casing 2 being lifted up, the user's turning operations on the left-side wheel 3 and the right-side wheel 4 are accepted as inputs, and the inputs are converted into the tune selecting command or the volume control command; on the other hand, in the automatic driving mode, the left-side wheel 3 and the right-side wheel 4 are driven to rotate, thereby causing the ellipsoidal casing 2 to run.

Thus, in the music reproducing robot apparatus 1, the left-side wheel 3 and the right-side wheel 4 can be used both for driving and for inputting, without providing other input units such as switches than the left-side wheel 3 and the right-side wheel 4.

With the above-described configuration, the control unit 30 of the music reproducing robot apparatus 1 assigns the tune selecting command or the volume control commands to the inputs made by operating the left-side wheel 3 and the right-side wheel 4 according to the orientation of the ellipsoidal casing 2. As a result, inputting operations can be performed always by the same operating method, by switching the commands to be assigned to the inputs made by operating the left-side wheel 3 and the right-side wheel 4 from the tune selecting command to the volume control command or from the volume control command to the tune selecting command, according to the orientation of the ellipsoidal casing 2. Therefore, it is possible to realize an input device and an inputting method which can be remarkably enhanced in operability, regardless of the orientation in which the ellipsoidal casing 2 is used.

(6) Other Embodiments

Thus, in the embodiment as above, description has been made of the case where the tune selecting command as a first command and a reproduction control command is assigned by the control unit 30, serving as a command assigning unit, to the input made by operating the wheel located on the upper side when the system is lifted up, whereas the volume control command as a second command and a reproduction control command is assigned by the control unit 30 to the input made by operating the wheel located on the lower side. However, the present invention is not limited to such a case, and other various commands may be assigned inasmuch as the commands can be inputted by turning the left-side wheel 3 and the right-side wheel 4. For example, an impassionate passage reproducing command as a first command and a reproduction command for selecting musical data (tune) to be reproduced and reproducing an impassionate passage (or bridge) of the musical data (tune) may be assigned to the input made by operating the wheel on the upper side, whereas an effect amount control function as a second command and a reproduction command for controlling the amount of an effect (a special effect) to be applied to musical data may be assigned to the input made by operating the wheel on the lower side.

Here, in practice, in the case where for example the impassionate passage reproducing command is assigned to the input made by operating the left-side wheel 3 on the upper side and the effect amount control command is assigned to the input made by operating the right-side wheel 4 on the lower side, when the control unit 30 in the command inputting mode has recognized based on the left-side wheel rotation detection signal LDe sent from the left-side wheel rotation detection sensor 43 that the left-side wheel 3 has been rotated by a predetermined amount in one direction (e.g., clockwise) and thereafter returned to its position before the rotation, the control unit 30 accepts this turning operation as an input, and converts this input into a next-tune impassionate passage reproducing command for selecting the tune next to the musical data (tune) being reproduced and for reproducing an impassionate passage of the next tune. Then, the control unit 30 reads the musical data of the tune next to the musical data (tune) being reproduced and reproduces the impassionate passage of the next tune, according to the next-tune impassionate passage reproducing command. Incidentally, in this case, time marks indicating the respective impassionate passages of tunes, for example, have been added to the musical data.

In addition, when the control unit 30 has recognized based on the left-side wheel rotation detection signal LDe sent from the left-side wheel rotation detection sensor 43 that the left-side wheel 3 has been rotated by a predetermined amount in the other direction (e.g., counterclockwise) and thereafter returned to its position before the rotation, the control unit 30 accepts this turning operation as an input, and converts this input into a preceding-tune impassionate passage reproducing command for selecting the tune precedent to the musical data (tune) being reproduced and for reproducing the impassionate passage of the preceding tune. Then, the control unit 30 reads the musical data of the tune precedent to the musical data (tune) being reproduced, and reproduces the impassionate passage of the preceding tune.

Further, when the control unit 30 has recognized based on the left-side wheel rotation detection signal LDe that the left-side wheel 3 has been rotated by a predetermined amount in one direction (e.g., clockwise) and thereafter kept in its position after the rotation for a predetermined time by an external force exerted by a user's finger, the control unit 30 accepts this turning operation as an input, and converts this input into a successive next-tune impassionate passage reproducing command for successively selecting the next tune, the next but one tune, and so on, in relation to the musical data (tune) being reproduced and for successively reproducing the respective impassionate passages of the next tune, the next but one tune, and so on. Then, according to the successive next-tune impassionate passage reproducing command, the control unit 30 successively selects the next tune, the next but one tune, and so on, during when the left-side wheel 3 is kept in its position after the rotation. Thereafter, when the control unit 30 has recognized based on the left-side wheel rotation detection signal LDe that the left-side wheel 3 has returned to its position before the rotation, the control unit 30 reads the musical data of the tune being selected at that moment, and reproduces the impassionate passage of the tune.

Furthermore, when the control unit 30 has recognized based on the left-side wheel rotation detection signal LDe that the left-side wheel 3 has been rotated by a predetermined amount in the other direction (e.g., counterclockwise) and thereafter kept in its position after the rotation for a predetermined time by an external force exerted by a user's finger, the control unit 30 accepts this turning operation as an input, and converts this input into a successive preceding-tune impassionate passage reproducing command for successively selecting the preceding tune, the preceding but one tune, and so on, in relation to the musical data (tune) being reproduced and for successively reproducing the respective impassionate passages of the preceding tune, the preceding but one tune, and so on. Then, according to the successive preceding-tune impassionate passage reproducing command, the control unit 30 successively select the preceding tune, the preceding but one tune, and so on, during when the left-side wheel 3 is kept in its position after the rotation. Thereafter, when the control unit 3 has recognized based on the left-side wheel rotation detection signal LDe that the left-side wheel 3 has returned to its position before the rotation, the control unit 30 reads the musical data of the tune being selected at that moment, and reproduces the impassionate passage of the tune.

Still further, when the control unit 30 has recognized based on the right-side wheel rotation detection signal RDe sent from the right-side wheel rotation detection sensor 45 that the right-side wheel 4 has been rotated by a predetermined amount in one direction (e.g., clockwise), the control unit 30 accepts this turning operation as an input, and converts this input into an effect amount increasing command for increasing the amount of the effect applied to the musical data being reproduced. Then, the control unit 30 controls the music processing unit 33 according to the effect amount increasing command, thereby increasing the amount of the effect applied to the musical data being reproduced.

Still furthermore, when the control unit 30 has recognized based on the right-side wheel rotation detection signal RDe sent from the right-side wheel rotation detection sensor 45 that the right-side wheel 4 has been rotated by a predetermined amount in the other direction (e.g., counterclockwise), the control unit 30 accepts this turning operation as an input, and converts this input into an effect amount decreasing command for decreasing the amount of the effect applied to the musical data being reproduced. Then, the control unit 30 controls the music processing unit 33 according to the effect amount decreasing command, thereby decreasing the amount of the effect applied to the musical data being reproduced.

In the embodiment as above, description has been made of the case where the control unit 30 discriminates the turning operations according to the rotating directions and rotation amounts of the left-side wheel 3 and the right-side wheel 4 in the command inputting mode, and performs the tune selecting processing and the volume control processing according to the respective turning operations. However, the present invention is not limited to such a case. For example, the turning operations may be discriminated according to the rotating directions, rotation amounts and rotating speeds of the left-side wheel 3 and the right-side wheel 4.

In this case, the control unit 30 is designed, for example, to skip a larger number of tunes in selecting a tune as the rotating speed of the left-side wheel 3 with the tune selecting command assigned to an input made by operation thereof is higher, and to skip a smaller number of tunes in selecting a tune as the rotating speed is lower. With this configuration, the control unit 30 permits the user to select the next tune, the next but one tune, the next but two tune, and so on, or the preceding tune, the preceding but one tune, the preceding but two tune, and so on, by a one-time turning operation, according to the rotating speed of the left-side wheel 3. Further, the control unit 30 is designed, for example, to control the sound volume by a larger increment or decrement as the rotating speed of the right-side wheel 4 with the volume control command assigned to an input made by operation thereof is higher, and to control the sound volume by a smaller increment or decrement as the rotating speed is lower. With this configuration, the control unit 30 permits the user to finely control the sound volume by a one-time turning operation, according to the rotating speed of the right-side wheel 4.

Thus, where the control unit 30 is designed to discriminate the turning operations by the rotating directions, rotation amounts and rotating speeds of the left-side wheel 3 and the right-side wheel 4, a larger number of commands can be inputted, and it is possible to input a command according to the operating sensation of the speed at which the user rotates the wheel. In addition to this, there may be adopted a configuration in which the rotating directions, rotation amounts and rotating speeds of the left-side wheel 3 and the right-side wheel 4 are combined in arbitrary manners, and the turning operations are discriminated according to the combinations.

Further, the control unit 30 may be designed to cause the left-side light emission unit 13 and the right-side light emission unit 18 to emit light according to the inputs made by such turning operations. In this case, the control unit 30 causes the left-side light emission unit 13 to emit light in a light emission condition according to the rotating direction, rotation amount and rotating speed of the left-side wheel 3, and causes the right-side light emission unit 18 to emit light in a light emission condition according to the rotating direction, rotation amount and rotating speed of the right-side wheel 4.

In practice, for example, upon recognizing that the left-side wheel 3 with the tune selecting command assigned to an input made by operation thereof has been rotated in a direction corresponding to the selection of the next tune, the control unit 30 controls the left-side light emission unit 13 so as to emit light in red color, whereas upon recognizing that the left-side wheel 3 has been rotated in a direction corresponding to the selection of the preceding tune, the control unit 30 controls the left-side light emission unit 13 so as to emit light in blue color. Besides, for example, when the right-side wheel 4 with the volume control command assigned to an input made by operation thereof has been turned, the control unit 30 controls the right-side light emission unit 18 so as to emit light at a brightness according to the sound volume at that moment. In other words, the control unit 30 varies stepwise the brightness of the right-side light emission unit 18 according to the sound volume, in such a manner as to increase the brightness of the right-side light emission unit 18 upon recognizing that the right-side wheel 4 has been rotated in a direction for increasing the sound volume, and to decrease the brightness of the right-side light emission unit 18 upon recognizing that the right-side wheel 4 has been rotated in a direction for decreasing the sound volume.

With this configuration, the control unit 30 makes it possible to recognize, not only through an operating sensation (a sensation as if a biasing spring were present or absent) but also visually, what sort of command has been inputted by the user through the left-side wheel 3 and the right-side wheel 4.

Further, in the embodiment as above, description has been made of the case where the command inputting mode is entered when the ellipsoidal casing 2 is lifted up. However, the present invention is not limited to such a case. For example, a configuration may be adopted in which the command inputting mode is entered when the ellipsoidal casing 2 is touched by the user, regardless of whether or not the ellipsoidal casing 2 is lifted up.

In this case, for example, upon recognizing based on the results of detection by the contact detection sensor unit 9 that the ellipsoidal casing 2 is touched by the user, the control unit 30 enters the command inputting mode. Then, for example, when the ellipsoidal casing 2 in the state of being placed on a floor is moved in the manner of a mouse by the user and the left-side wheel 3 and the right-side wheel 4 are rotated, the control unit 30 accepts the rotations as inputs, and converts the inputs into commands. Thus, the control unit 30 permits the left-side wheel 3 and the right-side wheel 4 to function like wheels of a mouse, whereby the ellipsoidal casing 2 can be operated like a mouse. Besides, in this case, the control unit 30 may permit the contact detection sensor unit 9 to function like a click button of a mouse.

Further, in the embodiments as above, description has been made of the case where the ellipsoidal casing 2 having a substantially ellipsoidal shape is used as a casing of the input device. However, the present invention is not limited to such a case. For example, casings having other various shapes such as a substantially spherical shape, a substantially cubic shape, etc. may also be used, inasmuch as the casing has a shape symmetrical on the left and right sides, a shape symmetrical on the upper and lower sides, or a shape symmetrical on the upper and lower sides and on the left and right sides.

Furthermore, in the embodiments as above, description has been made of the case where the left-side wheel 3 and the right-side wheel 4 mounted to be turnable relative to the ellipsoidal casing 2 are used as input units. However, the present invention is not limited to such a case. For example, the ellipsoidal casing 2 may be provided with a joggle dial, a button or the like, to be used as input unit(s). Besides, in the present invention, the number and positions of the wheels are not limited. For example, only one wheel may be provided, or three or more wheels may be provided. In addition, the wheels may be located at other positions than the positions on the left-side vertical plane S1 and the right-side vertical plane S2 which orthogonally intersect with the horizontal axis of the ellipsoidal casing 2 at positions equidistant from the center P1 of the ellipsoidal casing 2.

In practice, even in the case where the ellipsoidal casing 2 is provided with only one wheel, for example, when the control unit 30 is designed to always assign the next-tune selecting command to an input made by clockwise rotation as viewed from the user and assign the preceding-tune selecting command to an input made by counterclockwise rotation as viewed from the user, regardless of the orientation of the ellipsoidal casing 2, the inputting operations can be performed by a constantly fixed operating method, regardless of the orientation in which the ellipsoidal casing 2 is used.

Furthermore, in the embodiments as above, description has been made of the case where the left-side wheel 3 and the right-side wheel 4 provided as turning units for driving are used both for driving and for inputting. However, the present invention is not limited to such a case. For example, the left-side rotating body 10 and the right-side rotating body 15 provided as other turning units may be used both for driving and for inputting. Also in this case, like the left-side wheel 3 and the right-side wheel 4, the left-side rotating body 10 and the right-side rotating body 15 may each be provided with a rotation detection sensor composed of a rotary encoder or the like, whereby it is made possible for the control unit 30 to recognize the turning operations on the left-side rotating body 10 and the right-side rotating body 15, based on the results of detection by the rotation detection sensors.

Yet further, in the embodiments as above, description has been made of the case where the left-side wheel rotation detection sensor 43 and the right-side wheel detection sensor 45 each composed of a rotary encoder or the like are used for detecting the rotations of the left-side wheel 3 and the right-side wheel 4. However, the present invention is not limited to such a case, and other various sensors may also be used inasmuch as the sensors can detect the rotations of the left-side wheel 3 and the right-side wheel 4.

Still further, in the embodiments as above, description has been made of the case where the three-axis acceleration sensor unit 32 is used as an orientation detection unit. However, the present invention is not limited to such a case, and other various sensors may also be used inasmuch as the sensors can detect the orientation of the ellipsoidal casing 2.

Still furthermore, in the embodiments as above, description has been made of the case where the present invention is applied to the music reproducing robot apparatus 1 operable as an input device. However, the present invention is not limited to such a case, and may be applied to other various input devices such as other robot apparatuses, remote controllers, mouse, etc. inasmuch as the input device is used in an arbitrary orientation. For example, where the main body can perform communication by radio or the like system, a microphone may be provided in the vicinity of each of the loudspeakers 14 and 19, whereby the music reproducing robot apparatus 1 can be used as an IP phone. In this case, by detecting the orientation of the main body, the output from the loudspeaker on the upper side nearer to the user's ears is turned ON, whereas the output from the loudspeaker on the lower side is turned OFF; contrary to the loudspeakers, the input through the microphone on the lower side nearer to the user's mouth is turned ON, whereas the input through the microphone on the upper side is turned OFF. Incidentally, in this case, a loudspeaker opening control may be applied only to the loudspeaker on the upper side so that the loudspeaker on the upper side is opened but the loudspeaker on the lower side is closed. By the above-mentioned control such as to generate a difference in the input or output mode between the upper side and the lower side through detecting the orientation of he main body, it is possible to impart directionality to the input or output. Incidentally, where the main body is provided with a display, it may be contemplated to detect the orientation of the main body, and to set longitudinal or transverse the presentation on the display. The present invention is particularly effective when applied to other various input or output devices such as other robot apparatuses, remote controllers, mouse, etc. in which different processings are applied to input or output units in the case where a main body is provided with input or output units arranged in symmetry.

Yet furthermore, in the embodiments as above, description has been made of the case where the control unit 30 executes the command assigning processings on a software basis, according to a program installed in the music reproducing robot apparatus 1. However, the present invention is not limited to such a case. For example, a configuration may be adopted in which the music reproducing robot apparatus 1 is provided with a circuitry for executing these processings, and the processings are executed by the circuitry on a hardware basis. Besides, a configuration may be adopted in which a program for executing the command assigning processings is stored on a recording medium such as a CD.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
   an ellipsoidal symmetrical shaped casing designed to fit in a user's hand;
   an input unit provided in said casing, the input unit activatable by a particular movement of a user to generate a function of the input device according to an assigned command;
   an orientation detection unit configured to detect the gravitational orientation of said casing; and
   a command assigning unit configured to assign commands to inputs from said input unit based on the results of detection by said orientation detection unit, the commands including a first command associated with the first function of the input device and a second command associated with a second function of the input device, wherein different detected gravitation orientations of said casing cause different ones of the first and second commands to be assigned to said input unit activatable by the particular movement of the user.

2. The input device as set forth in claim 1, wherein
   two input units are provided at different positions of said casing; and
   said command assigning unit is configured to assign a first command to the input from said input unit on the upper side opposite to the side of said orientation of gravity and to assign a second command to the input from said input unit on the lower side coinciding with the side of said orientation of gravity, based on the results of detection by said orientation detection unit.

3. The input device as set forth in claim 1, wherein
   said input unit includes two wheels rotatably mounted at different positions of said casing, and
   said command assigning unit is configured to assign a first command to an input made by operating said wheel on the upper side opposite to the side of said orientation of gravity and to assign a second command to an input made by operating said wheel on the lower side coinciding with the side of said orientation of gravity, based on the results of detection by said orientation detection unit.

4. The input device as set forth in claim 1, wherein
   said symmetrical shape is shaped symmetrically on the left and right sides, shaped symmetrically on the upper and lower sides, or shaped symmetrically on the upper and lower sides and on the left and right sides.

5. The input device as set forth in claim 2, wherein
   said two input units are provided at positions equidistant from the center of said casing.

6. The input device as set forth in claim 1, wherein
   said command is a reproduction control command for controlling reproduction of musical data.

7. The input device of claim 1, wherein the input device further comprises an output device, wherein the output device comprises:
   an output unit provided in said casing;
   an output mode setting unit configured to set an output mode for an output from said output unit, based on the results of detection by said orientation detection unit; and
   a control unit configured to control said output unit so as to output based on said output mode set by said output mode setting unit.

8. The device as set forth in claim 7, wherein
   a plurality of output units are provided at different positions of said casing; and said output mode setting unit is configured to set a first output mode in said output unit on the upper side opposite to the side of said orientation of gravity, and to set a second output mode in said output unit on the lower side coinciding with the side of said orientation of gravity, based on the results of detection by said orientation detection unit.

9. The device as set forth in claim 7, wherein said output unit includes loudspeakers mounted at different positions of said casing.

10. The device as set forth in claim 7, wherein said symmetrical shape is shaped symmetrically on the left and right sides, shaped symmetrically on the upper and lower sides, or shaped symmetrically on the upper and lower sides and on the left and right sides.

11. The device as set forth in claim 8, wherein said output units are provided at positions equidistant from the center of said casing.

12. The input device of claim 1 further comprising an acceleration sensor, wherein the command assigning unit is activated by the acceleration sensor to enter a command inputting mode.

13. An inputting method comprising the steps of:

detecting the gravitational orientation of an ellipsoidal symmetrical shaped casing designed to fit in a user's hand; and assigning commands to inputs from an input unit provided in said casing the input unit activatable by a particular user action, the assigning based on the results of detection conducted in said orientation detecting step wherein the commands include a first command associated with the first function of the input unit and a second command associated with a second function of the input unit, wherein different detected gravitation orientations of said casing cause different ones of the first and second commands to be assigned to said input unit activatable by the particular user action.

* * * * *